US011979490B2

(12) United States Patent
Basu et al.

(10) Patent No.: US 11,979,490 B2
(45) Date of Patent: May 7, 2024

(54) NON-FUNGIBLE TOKEN BLOCKCHAIN PROCESSING

(71) Applicant: 0Chain Corp., Cupertino, CA (US)

(72) Inventors: Saswata Basu, Cupertino, CA (US); Thomas Howard Austin, San Jose, CA (US)

(73) Assignee: 0CHAIN CORP., Cupertino, CA (US)

( * ) Notice: Subject to any disclaimer, the term of this patent is extended or adjusted under 35 U.S.C. 154(b) by 332 days.

(21) Appl. No.: 17/672,842

(22) Filed: Feb. 16, 2022

(65) Prior Publication Data
US 2022/0173893 A1 Jun. 2, 2022

Related U.S. Application Data

(63) Continuation-in-part of application No. 17/349,815, filed on Jun. 16, 2021, which is a continuation-in-part of application No. 15/994,946, filed on May 31, 2018, now Pat. No. 11,165,862, application No. 17/672,842 is a continuation-in-part of application No.
(Continued)

(51) Int. Cl.
*H04L 29/06* (2006.01)
*G06Q 20/06* (2012.01)
*G06Q 20/22* (2012.01)
*H04L 9/08* (2006.01)
*H04L 9/32* (2006.01)
(Continued)

(52) U.S. Cl.
CPC ......... *H04L 9/0825* (2013.01); *G06Q 20/065* (2013.01); *G06Q 20/223* (2013.01); *H04L 9/0891* (2013.01); *H04L 9/0894* (2013.01); *H04L 9/3242* (2013.01); *H04L 9/3247* (2013.01); *H04L 9/3297* (2013.01); *H04L 9/50* (2022.05); *H04L 63/10* (2013.01); *H04L 2209/56* (2013.01)

(58) Field of Classification Search
None
See application file for complete search history.

(56) References Cited

FOREIGN PATENT DOCUMENTS

| CN | 107992923 A | * | 5/2018 | |
|---|---|---|---|---|
| EP | 3540662 A1 | * | 9/2019 | ......... G06Q 10/0833 |

OTHER PUBLICATIONS

Grace Period Disclosure, Saswata Basu, Thomas Austin, Devin Conley, "0CHAIN NFT metadata storage," https://medium.com/0chain/0chain-for-nft-metadata-storage-16e6e971b611, Feb. 3, 2022.

* cited by examiner

*Primary Examiner* — Andrew J Steinle
(74) *Attorney, Agent, or Firm* — Levine's Tech Consulting LLC; Frank E. Levine

(57) ABSTRACT

An approach is disclosed for processing NFTs on a blockchain platform. A request for processing an NFT is received on the blockchain platform, by a requestor. The NFT is accessed by chunks C (C1, C2, ..., Cn) from at least two blobbers B (B1, B2, ..., Bn). The NFT is reconstructed from the chunks C (C1, C2, ..., Cn) to process the request. The supported requests include creating, viewing, purchasing, transferring ownership, setting permissions for reveal of data at a future date, adding, updating, deleting, moving, copying, and renaming data assets. The NFT may be transferred from one blockchain platform to a different blockchain platform, and may be initially used as a fundraising vehicle by the creator with no data asset initially and later uploaded to the blobbers.

30 Claims, 11 Drawing Sheets

Related U.S. Application Data

17/307,073, filed on May 4, 2021, now Pat. No. 11,637,709, which is a continuation-in-part of application No. 16/247,994, filed on Jan. 15, 2019, now Pat. No. 11,171,791, application No. 17/672,842 is a continuation-in-part of application No. 16/213,360, filed on Dec. 7, 2018, now Pat. No. 11,379,832, and a continuation-in-part of application No. 17/349,748, filed on Jun. 16, 2021, now Pat. No. 11,785,079, and a continuation-in-part of application No. 17/349,779, filed on Jun. 16, 2021, and a continuation-in-part of application No. 17/349,833, filed on Jun. 16, 2021, now Pat. No. 11,930,100.

(60) Provisional application No. 62/707,177, filed on Oct. 24, 2017.

(51) Int. Cl.
*H04L 9/00* (2022.01)
*H04L 9/40* (2022.01)

NON-FUNGIBLE TOKEN BLOCKCHAIN PROCESSING

The following disclosure(s) are submitted under 35 U.S.C. 102(b)(1)(A): DISCLOSURE: "0CHAIN NFT metadata storage," by Saswata Basu, Thomas Austin, and Devin Conley at web location https://medium.com/0chain/0chain-for-nft-metadata-storage-16e6e971b611 on Feb. 3, 2022.

If an Application Data Sheet (ADS) has been filed for this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a utility application related to and claims the benefit of priority from U.S. Provisional Patent Application No. 62/707,177 filed on Oct. 24, 2017.

The present invention relates to a computing environment, and more particularly processing of non-fungible tokens utilizing blockchain technology.

SUMMARY

According to one embodiment of the invention, there is a method that includes a processor and a local storage device accessible by the processor for processing NFTs on a blockchain platform. A request for processing an NFT is received on the blockchain platform, by a requestor. The NFT is accessed by chunks C (C1, C2, . . . , Cn) from at least two blobbers B (B1, B2, . . . , Bn). The NFT is reconstructed from the chunks C (C1, C2, . . . , Cn) to process the request.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
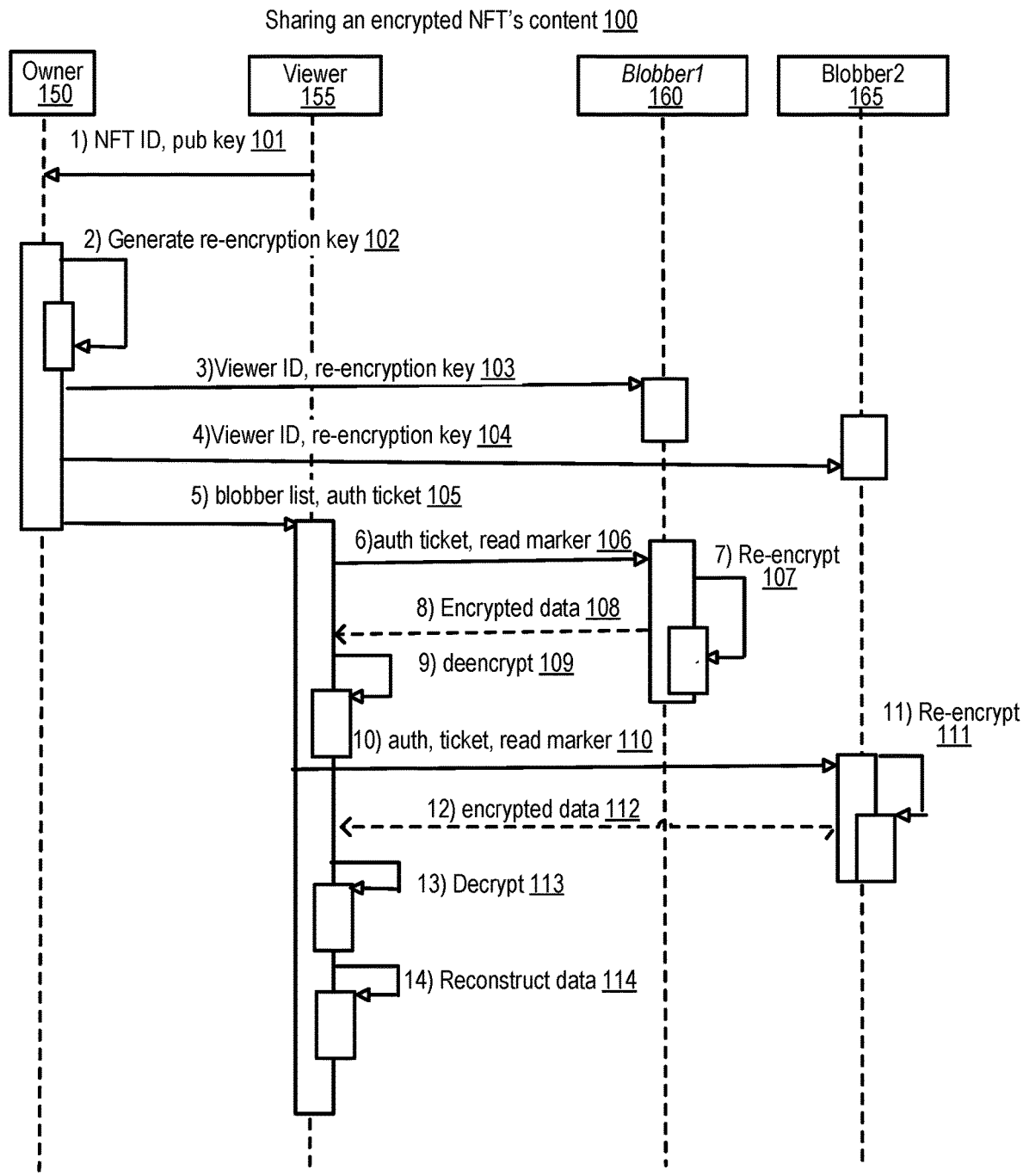
FIG. 1 shows an overview of the process of sharing an encrypted NFT content.

Blockchain technology, sometimes also referred to as "blockchain," is a particular type of distributed database. Blockchains can theoretically be used to store any type of data or content, but are particularly well-suited to environments in which transparency, anonymity, and verifiability are important considerations. Examples include financial projects, such as cryptocurrencies, auctions, capital management, barter economies, insurance lotteries, and equity crowd sourcing.

A blockchain, originally block chain, is a growing list of records, called blocks, that are linked using cryptography. Each block contains a cryptographic hash of the previous block, a timestamp, and transaction data (generally represented as a Merkle tree). The Merkle tree is a hash-based data structure that is a generalization of the hash list. It is a tree structure in which each leaf node is a hash of a block of data, and each non-leaf node is a hash of its children. Typically, Merkle trees have a branching factor of 2, meaning that each node has up to 2 children.

By design, a blockchain is resistant to modification of its data. This is because once recorded, the data in any given block cannot be altered retroactively without alteration of all subsequent blocks. For use as a distributed ledger, a blockchain is typically managed by a peer-to-peer network collectively adhering to a protocol for inter-node communication and validating new blocks. Although blockchain records are not unalterable, blockchains may be considered secure by design and exemplify a distributed computing system with high Byzantine fault tolerance. A Byzantine fault is a condition of a computer system, particularly distributed computing systems, where components may fail and there is imperfect information on whether a component has failed. The blockchain has been described as "an open, distributed ledger that can record transactions between two parties efficiently and in a verifiable and permanent way."

The technology is perhaps most easily understood through a simple and familiar example, such as "Bitcoin," a cryptocurrency. A cryptocurrency is not entirely dissimilar from conventional currencies and, like a traditional currency, is essentially a medium of exchange. Traditional currencies are represented by a physical object paper currency or minted coins, for example-which is "spent" by physically delivering it in the proper denominations to a recipient in exchange for a good or service.

However, for long-distance transactions, such as buying goods or services over the Internet, direct physical delivery is not feasible. Instead, the currency would have to be mailed to the recipient. However, this carries a very high risk of fraud. The recipient may simply keep the money and not deliver the purchased good or service, leaving the buyer without recourse. Instead, on-line transactions are typically carried out using electronic payment systems in which the transaction is processed, validated, and mediated by a trusted third party. This third party may be a bank, as in the case of a debit or credit card, or a third party service functioning as an escrow agent, such as PayPal. Crypto currencies operate on this same principle, except that instead of using a financial institution or other third party to facilitate the transaction, the transaction is verified through a consensus reached via cryptographic proof.

Internet is a global computer network providing a variety of information and communication facilities, comprising interconnected networks using standardized communication protocols. Internet is not owned by a single entity and it operates without a central governing body. The same principles of distributed governance were applied to digital currencies by providing ability to perform digital transactions that existed without support from any underlying institution. The digital ledger that records the transactions in a chain using a mathematical hierarchy is called a blockchain.

The current blockchain platform and related applications known to the industry fall short in multiple ways. First, there is no separation of roles on the blockchain based on the role of an entity for a given transaction. Each transaction follows a strict chain of rules and is dependent on its preceding transaction. If one transaction fails, all subsequent transactions on the blockchain become unusable. The computing time and built in delay in any blockchain platform is dependent on the available computing resources of its nodes. In absence of a role model, a single node has several computing intense tasks that are slow to execute. A slow system becomes vulnerable and becomes open to attacks. The current solutions do not allow for client flexibility in developing distributed applications with immutability and finality of transactions on a blockchain platform.

In order to overcome the deficiencies of the prior art, various methodologies are disclosed where an infrastructure is supplied to enable usage of the disclosed methodology. In an embodiment, application programming interfaces (API) are provided to handle the details. For this disclosure, high level descriptions of the details are discussed which should be adequate for those with ordinary skill in the art to implement solutions. In this disclosure, support for the identified features may be identified as modules in the blockchain platform with embodiments as described herein embedded in the modules.

The following definitions generally apply to this disclosure and should be understood in both the context of client/server computing generally, as well as the environment of a blockchain network. These definitions, and other terms used herein, should also be understood in the context of leading white papers pertaining to the subject matter. These include, but are not necessarily limited to, Bitcoin: A Peer-to-Peer Electronic Cash System (Satoshi Nakamoto 2008). It will be understood by a person of ordinary skill in the art that the precise vocabulary of blockchains is not entirely settled, and although the industry has established a general shared understanding of the meaning of the terms, reasonable variations may exist.

The term "network" generally refers to a voice, data, or other telecommunications network over which computers communicate with each other. The term "server" generally refers to a computer providing a service over a network, and a "client" generally refers to a computer accessing or using a service provided by a server over a network. The terms "server" and "client" may refer to hardware, software, and/or a combination of hardware and software, depending on context. The terms "server" and "client" may refer to endpoints of a network communication or network connection, including but not necessarily limited to a network socket connection. A "server" may comprise a plurality of software and/or hardware servers delivering a service or set of services. The term "host" may, in noun form, refer to an endpoint of a network communication or network (e.g., "a remote host"), or may, in verb form, refer to a server providing a service over a network ("hosts a website"), or an access point for a service over a network. It should be noted that the term "blockchain network" as used herein usually means the collection of nodes interacting via a particular blockchain protocol and ruleset. Network nodes are the physical pieces that make up a network. They usually include any device that both receives and then communicates information. But they might receive and store the data, relay the information elsewhere, or create and send data instead.

The term "asset" means anything that can be owned or controlled to produce value.

The term "asymmetric key encryption," also known as "public key encryption," "public key cryptography," and "asymmetric cryptography," means a cryptographic system that uses pairs of mathematically related keys, one public and one private, to authenticate messages. The "private key" is kept secret by the sending of a message or document and used to encrypt the message or document. The "public key" is shared with the public and can be used to decrypt the message or document.

The term "ledger" means the append-only records stored in a blockchain. The records are immutable and may hold any type of information, including financial records and software instructions.

The term "blockchain" means a distributed database system comprising a continuously growing list of ordered records ("blocks") shared across a network. In a typical embodiment, the blockchain functions as a shared transaction ledger.

The term "transaction" means an asset transfer onto or off of the ledger represented by the blockchain, or a logically equivalent addition to or deletion from the ledger.

The term "blockchain network" means the collection of nodes interacting via a particular blockchain protocol and rule set.

The term "nonce" means an arbitrary number or other data used once and only once in a cryptographic operation. A nonce is often, but not necessarily, a random or pseudo-random number. In some embodiments, a nonce will be chosen to be an incrementing number or time stamp which is used to prevent replay attacks.

The term "block" means a record in a continuously growing list of ordered records that comprise a blockchain. In an embodiment, a block comprises a collection of confirmed and validated transactions, plus a nonce.

The term "hash" means a cryptographic algorithm to produce a unique or effectively unique value, properly known as a "digest" but sometimes informally referred to itself as a "hash," usually from an arbitrary, variable-sized input. Hashes are repeatable and unidirectional, meaning the algorithm always produces the same digest from the same input, but the original input cannot be determined from the digest. A change to even one byte of the input generally results in a very different digest, obscuring the relationship between the original content and the digest. SHA256 (secure hash algorithm) is an example of a widely used hash.

The term "mining" means the process by which new transactions to add to the blockchain are verified by solving a cryptographic puzzle. In a proof-of-work blockchain network, mining involves collecting transactions reported to the blockchain network into a "block," adding a nonce to the block, then hashing the block. If the resulting digest complies with the verification condition for the blockchain system (i.e., difficulty), then the block is the next block in the blockchain.

The term "miner" refers to a computing system that processes transactions. Miners may process transactions by combining requests into blocks. In embodiments, a miner has a limited time, for example, 15-50 milliseconds, to produce a block. Not all miners generate blocks. Miners that generate blocks are called "generators." Miners may be ranked and chosen to perform transactions based on their ranking. Some limited number of miners may be chosen to perform validation. All miners must be registered on the blockchain. The mining process involves identifying a block that, when hashed twice with SHA256 yields a number smaller than the given difficulty target. While the average work required increases in inverse proportion to the difficulty target, a hash can always be verified by executing a single round of double SHA-256. For the bitcoin timestamp network, a valid proof-of-work is found by incrementing a nonce until a value is found that gives the block's hash the required number of leading zero bits. Once the hashing has produced a valid result, the block cannot be changed without redoing the work. As later blocks are chained after it, the work to change the block would include redoing the work for each subsequent block. Majority consensus is represented by the longest chain, which required the greatest amount of effort to produce. If a majority of computing power is controlled by honest nodes, the honest chain will grow fastest and outpace any competing chains. To modify a past block, an attacker would have to redo the proof-of-work of that block and all blocks after it and then surpass the work of the honest nodes. The probability of a slower attacker catching up diminishes exponentially as subsequent blocks are added.

Messages representing generated blocks are sent to all miners by identifying the block with a block hash, transaction hash, and a signature of the minor producing the block. The miners receiving the messages replay the transactions for the block and sign an authentication message. If there is enough miners authenticating the block, a consensus ticket is signed. In some embodiments a $\frac{2}{3}+1$ agreement or 67% agreement is needed to generate the consensus ticket.

The term "sharding" is a technique in blockchain that seeks to achieve scalability within a blockchain network. The process of sharding seeks to split a blockchain network into separate shards, that contain their own data, separate from other shards.

The term "sharder" refers to a computing system that that keeps tracks of its blockchain history. They are a single source of truth regarding any given transaction.

The term "transaction fee" means a fee imposed on some transactions in a blockchain network. The amount of the transaction fee is awarded to the miner who successfully mines the next block containing that transaction.

The term "wallet" means a computer file or software of a user that allows a user of a blockchain network to store and spend cryptocurrency by submitting transactions to the blockchain network. A wallet is usually itself protected by cryptography via a private key.

The term "consensus" refers to a computational agreement among nodes in a blockchain network as to the content and order of blocks in the blockchain.

The term "digital signature" means a mathematically-based system for demonstrating the authenticity of a message or document by ensuring that it was sent from the identified sender and not tampered with by an intermediary. Blockchains generally use asymmetric key encryption to implement digital signatures.

The term "fork" means a split in a blockchain where two different valid successor blocks have been mined and are present in the blockchain, but consensus has not yet been reached as to which fork is correct. This type of fork is also referred to as a "soft fork," and is automatically resolved by consensus over time. A "hard fork" is the forced imposition of a fork by manual intervention to invalidate prior blocks/transactions, typically via a change to the blockchain rules and protocol.

The term "cryptocurrency" (or "crypto") is a digital currency that can be used to buy goods and services, but uses an online ledger with strong cryptography to secure online transactions. Much of the interest in these unregulated currencies is to trade for profit, with speculators at times driving prices skyward. There are currently many different types of cryptocurrencies offered by many different blockchain implementations. The usage of any given cryptocurrency may be represented herein as "tokens."

The term "genesis block" means the very first block in a blockchain, that is, the root of the Merkle tree.

The term "proof-of-stake" means a mining system in which the production and verification of a block is pseudo-randomly awarded to a candidate miner, or prioritized list of candidate miners, who have invested a valuable stake in the system which can be collected by the blockchain network if the produced block is later deemed invalid. The stake functions as a deterrent against fraudulent blocks.

The term "proof-of-work" means a mining system in which the difficulty of finding a nonce that solves the cryptographic puzzle is high enough that the existence of a block compliant with the verification rules is itself sufficient proof that the block is not fraudulent.

The term "smart contracts" means computer programs executed by a computer system that facilitate, verify, or enforce the negotiation and performance of an agreement using computer language rather than legal terminology. Smart contracts may be verified and executed on virtual computer systems distributed across a blockchain.

The terms "web," "web site," "web server," "web client," and "web browser" refer generally to computers programmed to communicate over a network using the HyperText Transfer Protocol ("HTTP"), and/or similar and/or related protocols including but not limited to HTTP Secure ("HTTPS") and Secure Hypertext Transfer Protocol ("SHTP"). A "web server" is a computer receiving and responding to HTTP requests, and a "web client" is a computer having a user agent sending and receiving responses to HTTP requests. The user agent is generally web browser software.

The term "erasure code" is a forward error correction (FEC) code under the assumption of bit erasures (rather than bit errors), which transforms a message of k symbols into a longer message (code word) with n symbols such that the original message can be recovered from a subset of the n symbols. The fraction r=k/n is called the code rate.

With the disclosed design, the majority of the work between clients and blobbers happens off-chain. The mining network is only involved enough to ensure that clients pay blobbers for their work and that the blobbers are doing the work that they have been paid to do. This approach assumes that the client is using erasure codes to ensure greater resiliency. While this is not a strict requirement, it does enable a client to recover if a blobber proves to be unreliable.

In an embodiment, the split-key wallet protocol uses a Boneh-Lynn-Shacham (BLS) signature scheme that is based on bi-linear pairings. A pairing, defined as e(,), is a bilinear map of 2 groups G1 and G2 in some other group, GT. e(,) takes e as arguments points in G1 and G2.

Pairings that verifies a signature have the form: e(g1, sig)=e(pk, H(m)) (in expanded form: e(g1, sk*H(m))=e (sk*g1, H(m))=e(g1, sk*H(m))) H(m) is hashing a message to a point on an elliptic curve. BLS has:

KeyGen—choose a random α. Given generator g1, pk=α*g1

Sign—σ=α*H(m)∈G2 (in the case of eth2.0)

Verify(pk,m, σ)—if e(g1, σ)=e(pk, H(m)) return true.

The BLS signature scheme may be used to split keys and let users interact using crypto keys via a blockchain. Since the cryptocurrency balance is maintained against these keys, it's very important to protect the private key. The private key is split into two secondary keys, storing each of the secondary key on a different device. Signing requires individual signatures from each device. Hence, losing any one device can still protect the primary key. In addition, if desired, one of the secondary keys can be further split into two parts; only one of which is stored on the device and the other may be a simple PIN that the user has to enter each time. This provides an extra layer of protection in case both devices are compromised. The split-key wallet protocol makes it easy to generate as many split keys as desired providing the ability for the user to periodically rotate the split keys and in the process change the PIN.

The term "database" means a computer-accessible, organized collection of data, which may be referred to as "content" in this document. Databases have been used for decades to format, store, access, organize, and search data. Traditionally, databases were stored on a single storage medium controlled by a single computer processor, such as a fixed disk or disk array. However, databases may also be organized in a "distributed" fashion, wherein the database is stored on a plurality of storage devices, not all of which are necessarily operated by a common processor. Instead, distributed databases may be stored in multiple component parts, in whole or part, dispersed across a network of interconnected computers. "Difficulty" means proof-of-work mining, or the expected total computational effort necessary to verify the next block in a blockchain. Difficulty is generally determined by the verification rules of the blockchain and may be adjusted over time to cause the blockchain to grow (e.g., new blocks to be verified and added) at a desired rate. For example, in the Bitcoin blockchain network, the difficulty adjusts to maintain a block verification time of about ten minutes across the blockchain network.

It will be understood by one of ordinary skill in the art that common parlance in the computing industry refers to a "user" accessing a "site." This usage is intended to represent technical access to an online server by a user via a user computer. That is, the reference to a "user" accessing a "server" refers to the user manipulating or otherwise causing client software to communicate over a telecommunications network with server software. This also typically means that the user's client software is running on a client computer system and accessing the server computer system remotely. Although it is possible that a user may directly access and use the server via the server hardware, and without use of a client system, this is not the typical use case in a client/server architecture.

The systems and methods described herein enable a user in a rewards- or points-based system implemented via a blockchain network, to purchase a content according to a terms of a smart contracts. Users can receive, store, and share or send rewards on-demand in exchange for receiving the content. However, the user need not directly use, or even be aware of, the underlying blockchain.

Described herein are systems and methods for an on-line, verifiable payment system that facilitates both manual and automatic payment with transaction costs as small as fractions of a cent. The systems and methods include a financial accounting system that uses smart contract technology and a centralized authority performing blockchain transactions on behalf of multiple independent users, and using bulk processing of transactions to reduce substantially the associated transaction fees, in some cases to fractions of a penny.

One key distinction of the disclosed data storage system from other blockchain storage solutions is the separation of the role of mining from that of providing storage. Computers that provide storage are referred to as blobbers. Blobbers are neither responsible nor required to perform mining. In this manner, the load is lightened on the mining network and enables fast transactions on a lightweight blockchain. As the client and blobber interact, the client generates special signed receipts called markers. These markers act like checks that the blobber can later cash in with the blockchain.

Once the interaction between client and blobber has concluded, the blobber writes an additional transaction to the blockchain, which redeems the markers for tokens, that is, the platform cryptocurrency, and commits the blobber to a Merkle root matching the data stored. The leaves of the Merkle tree must match markers sent from the client, preventing either the client or the blobber from defrauding each other.

A non-fungible token (NFT) is a one-of-a-kind asset that lives online and is managed in a digital ledger. These digitally unique assets are attached to a distinct value with a certificate of authenticity, so even though it exists online, the asset can't be easily and endlessly duplicated. NFTs have been used as a way of rewarding content creators. Artists publish their works on the blockchain as NFTs, which they can then sell. The buyer of an NFT then holds ownership of a unique digital asset, which can be resold in much the same way that real-world art collectors might trade paintings. The use of NFTs across areas such as art, gaming, music, fashion, sports, collectibles, and more has been increasing. For collectors, fans, and enthusiasts, blockchain technology offers the benefits of verifiable ownership, digital scarcity, interoperability, and an immutable ledger of history. These industries have begun to recognize that value and are starting to take advantage.

The use of NFTs as a mechanism for rewarding artists has gained in popularity, with Ethereum ERC-721 tokens being a particularly popular vehicle. However, storing the data for larger NFTs on the Ethereum blockchain is expensive. Furthermore, the owner of an NFT might wish to encrypt it, providing access to the data only when a viewer pays to see it. They also might wish to provide for multiple resolution files for an NFT, or even to support mutability to allow for new artistic forms that could increase its value for a buyer. However, in most cases today, there is actually a major gap in the "decentralization" of these tokens. While the certificate of ownership is stored on the blockchain via smart contract, the actual metadata, including name, description, and image, is stored off-chain. Due to space requirements, this data is typically stored on centralized services such as Amazon Web Services (AWS) or on unreliable and slow networks such as InterPlanetary File System (IPFS).

A design is disclosed for storing data associated with an ERC-721 tokens on a blockchain, hereafter called the current blockchain platform. In the disclosed process, a shadow NFT is a data allocation managed on the current blockchain that may be tied to an ERC-721 token. The NFT Smart Contract (NFT_SC) may be an Ethereum smart contract that is approved to sell an ERC-721 token for its owner. Instead of Ethereum, a different blockchain different from the current blockchain may have its own smart contract for selling ERC-721 tokens. In an embodiment, NFT_SC is a smart contract that is approved to sell ERC-721 token for its owner on a different platform from the current blockchain. The current blockchain may have its own NFT Smart Contract (ZNFT_SC), responsible for managing shadow NFTs. A curator monitors the NFT_SC for transactions, for example, but not limited to transaction that transfer ownership of the NFT and manages the corresponding shadow NFT on the current blockchain, acting through calls to the ZNFT_SC.

The artist is the creator and initial owner of an NFT. When the owner of the NFT would like to transfer the NFT between blockchains, the owner is expected to have accounts on both blockchains. In an embodiment, the accounts may be managed through a curator application (app) to provide a seamless experience coordinating the actions for the two blockchains. Blobbers follow the current blockchain's storage protocol to store the actual data for an NFT. Viewers pay the owner for access to the content of an NFT; they are likewise expected to have valid accounts in both blockchain platforms. In an embodiment, the curator is a single entity, such as an art house selling NFTs. Alternatively, a group of curators could collectively manage the shadow NFTs if desired.

The current blockchain is a high performance decentralized storage network. It supports free storage, allowing clients to initially experiment with the current system. Should a client require additional storage, the client can purchase additional tokens, which can be used to reserve additional storage resources. On the current blockchain, tokens may be placed in token pools. A client can then give signed markers to other clients, allowing those other clients to draw funds from the token pools. The combination of token pools and markers is roughly analogous to banking accounts and checks. The current blockchain platform has a focus on creating a marketplace for storage. Blobbers provide the storage, curated by the blockchain. Data for the blobbers is erasure coded and encrypted, ensuring that no single blobber is given an inordinate amount of power over the data that it stores. Through the use of proxy re-encryption, the client's data can be easily and efficiently re-encrypted for any recipient without revealing it to the blobbers themselves. For their work, clients pay blobbers in read markers and write markers, allowing the blobbers to draw on funds from the appropriate token pools (referred to as the read pool and write pool respectively).

In an embodiment, an owner should first register with the curator, providing accounts for both blockchains. By doing so, they allow the curator to ensure that transfer of an NFT can trigger the transfer of the shadow NFT as well. When an artist wishes to create a new NFT, they first sign into the curator app, which (if needed) manage the creation of wallets on both platforms on the artists behalf. In this context, the curator app can serve as a proxy for the artist. The artist uploads unencrypted data for the NFT through the curator app. The curator app creates an ERC-721 token on the other blockchain using the artist's wallet. Optionally, the ERC-721 token could include a hash of the unencrypted data to allow validation of the data, if the NFT's data is intended to be immutable.

Using the artist's other platform's wallet, the curator app approves the NFT_SC to control the NFT. Additionally, the curator app creates an encryption key pair specifically for the NFT using the artist's wallet. If desired, the app then encrypts data with public key of the artist's wallet. Once the data is ready, the curator app calls the ZNFT_SC to create a shadow NFT using artists' wallet, specifying the ERC-721 token ID as well as the normal storage details needed for a new allocation. The allocation is marked as an NFT, and thereby only transferable by ZNFT_SC which in turn only recognizes the authority of the curator. The artist is identified as the initial owner of the shadow NFT. Note that an "owner" of a shadow NFT may be allowed to modify the data if desired. However, the owner cannot directly transfer the NFT, instead needing to go through the NFT_SC on the other blockchain to do so. To pay for the storage, the curator application (curator app); hereafter called curator app, locks tokens for the NFT's allocation token pool with the payer ID for the locked or generated tokens set to the curator. The curator app then uploads the encrypted data to the new shadow NFT allocation on behalf of the artist, following the current platforms normal storage protocol. As part of the normal process, the blobbers commit writer markers, which commits them to the data stored.

An NFT owner may wish to share their content, possibly for compensation. For unencrypted NFTs, the process is straightforward. However, if encryption is used, a few additional steps must be taken. This process takes advantage of proxy re-encryption so that the viewer of the data may receive the data encrypted with their own public key, whereas the blobbers storing the data never see the unencrypted content. The owner's private key is a key component of the re-encryption process, so a proxy for the owner (with the owner's private key) must be available online. This role could be managed by the curator, or the owner might have their own proxy machine.

FIG. 1 shows an overview of the process of sharing an encrypted NFT's content 100. The encrypted NFT may be a shadow NFT. In some embodiments, a request for processing an NFT is received on the blockchain platform, by a requestor. The NFT is accessed by chunks C (C1, C2, ..., Cn) from at least two blobbers B (B1, B2, ..., Bn). The NFT is reconstructed from the chunks C (C1, C2, ..., Cn) to process the request. The request may be one viewing, editing, purchasing, funding, and transferring ownership of the NFT. Various means may be used to specify the NFT, for example, but not limited to, a content identification, an NFT ID, a path identification, a Uniform Resource Identifier (URI), a Uniform Resource Locator (URL), and the like.

The following steps occur:
1) [NFT ID, pub key 101]: The viewer 155 sends the owner 150 a request for an NFT, specifying both the desired NFT and the viewer's public key.
2) [Generate re-encryption key 102]: A re-encryption key is generated using the owner's private key and the viewer's public key.

3) [Viewer ID, re-encryption key 103]: The re-encryption key is sent to blobber1 160 along with the ID of the viewer 155.
4) [Viewer ID, re-encryption key 104]: The re-encryption key is sent to blobber2 165 along with the ID of the viewer 155.
5) [blobber list, auth ticket 105]: The owner 150 sends the list of blobbers to the viewer 155 along with an authorization ticket. The authorization ticket includes
   a) The ID of the NFT.
   b) The expiration of the ticket and any other restrictions desired.
   c) The ID of the viewer 155 allowed to receive the NFT or related data.
6) [auth ticket, read marker 106]: The viewer 155 sends the authorization ticket and the read marker to blobber1 160.
7) [re-encrypt 107]: After verifying the authorization ticket, the blobber1 160 re-encrypts the data for the viewer 155.
8) [encrypted data 108]: Blobber1 160 sends the encrypted data, a portion of the NFT to the viewer 155.
9) [decrypt 109]: Upon receiving the encrypted data, a portion of the NFT, the viewer 155 decrypts the data using the viewer's private key,
10) [auth ticket, read marker 110]: The viewer 155 sends the authorization ticket and the read marker to blobber2 165.
11) [re-encrypt 111]: After verifying the authorization ticket, the blobber2 165 re-encrypts the NFT for the viewer 155.
12) [encrypted data 112] The blobber 2 165 sends the encrypted data to the viewer 155.
13) [decrypt 113]: Upon receiving the NFT, the viewer 155 decrypts the NFT using the viewer's private key.
14) [Reconstruct data 114]: Once all slices of the data have been received, the viewer 110 reconstructs the original data, that is, the NFT.

In an embodiment, there may be a messaging service to share links to other entities which automates this process.

The process for transferring an NFT differs depending on whether encryption is used. Without encryption, the transfer of ownership of the shadow NFT happens automatically without any additional involvement from either the seller or the purchaser. The curator monitors the calls to the NFT_SC, and automatically transfers control of the shadow NFT to the purchaser's current blockchain account.

However, if encryption is used, additional steps are required. Before the purchaser buys the ERC-721 token, they must download the shadow NFT content. Failure to do so could mean that the data is lost. After the transfer is complete, the purchaser must encrypt the data with their own public key and upload to the blobbers. While this process could fail and leave the Shadow NFT in the hands of the seller, the purchaser is the critical actor for all required steps. The seller has no opportunity to disrupt this process (provided that the buyer has the shadow NFT data stored locally already).

Figure 2:
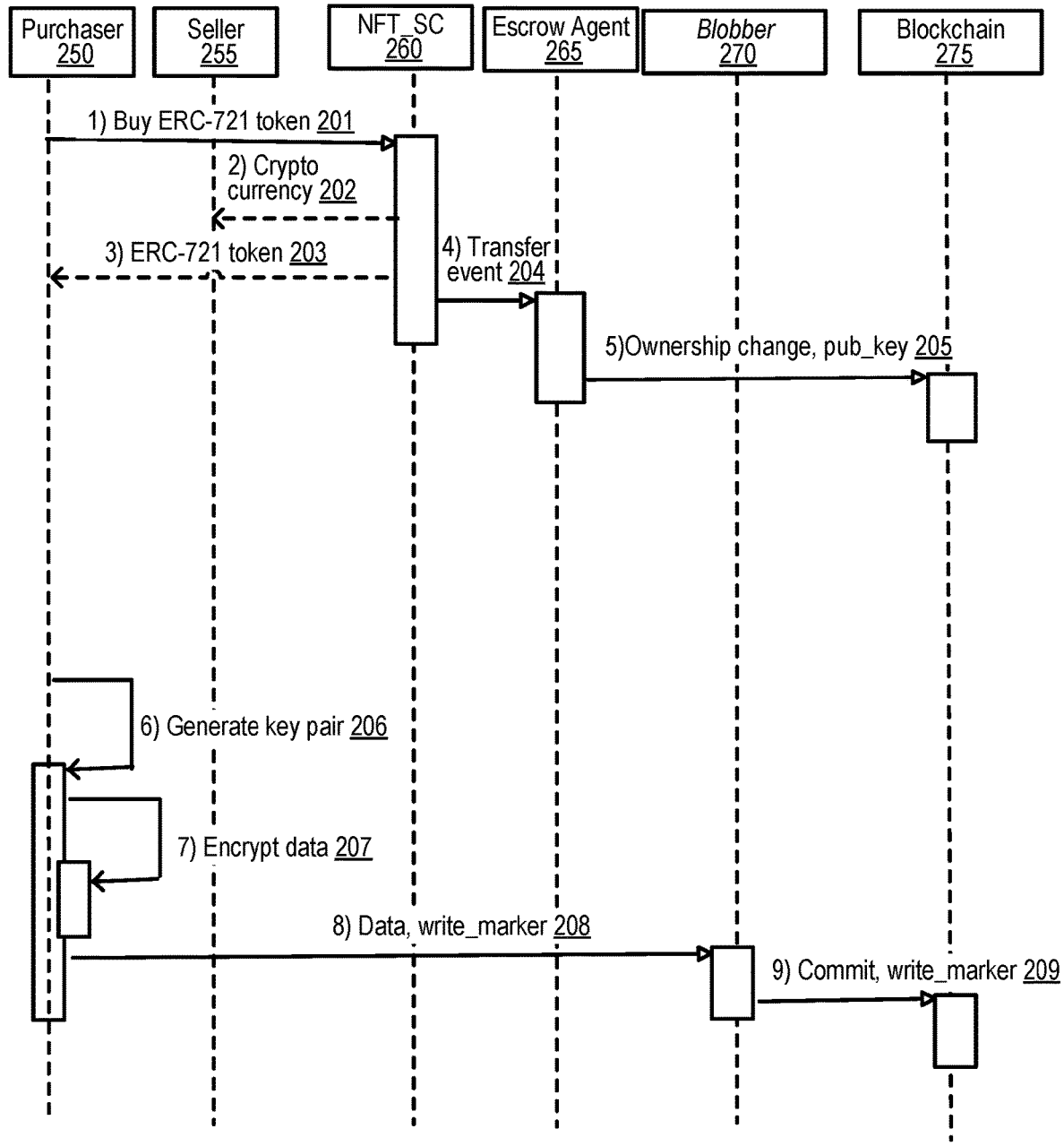
FIG. 2 shows a sequence diagram outlining the process for selling or transferring of an NFT.

FIG. 2 shows a flow diagram outlining the process for the sale or transferring of an NFT 200.

Prior to this phase, it is assumed that the seller has approved the NFT_SC to manage the ERC-721 token on the other blockchain. Then the following steps occur:

1) [Buy ERC-721 token 201]: The purchaser 250 buys the ERC-721 token according to the NFT_SC 260.
2) [Cryptocurrency 202]: The NFT_SC 260 transfers the native cryptocurrency on the other blockchain platform to the seller 255.
3) [ERC-721 token 203]: The NFT_SC 260 transfers the ERC-721 token to the purchaser 250.
4) [Transfer event 204]: The NFT_SC 260 notifies the escrow agent 265 that a transfer event has occurred.
5) [Ownership change, public key 205]: The NFT_SC 260 notifies the blockchain 275 of the ownership change.
6) [Generate key pair 206]: The purchaser 250 generates a new key pair from the seller's public key and the purchaser's private key.
7) [Encrypt data 207]: Using the public key of the seller 255, the purchaser 250 encrypts the data).
8) [Data, write marker 208]: The purchaser 250 uploads the data to the blobber 270, along with a write marker to pay for the storage.
9) [Commit, write_marker 209]: The blobber 270 commits the write marker to the blockchain 275. When the blobber redeems the write marker on the blockchain, they have committed to storing the updated data. The blobber must verify the ownership change from the blockchain, as is standard any time that a write is performed by a different owner than previously. Steps (8) and (9) are repeated for each blobber and may be done in parallel with the previous steps, potentially even before the ERC-721 token has been purchased.

Note that the curator must know the association between both of the purchaser's blockchain accounts. Otherwise, another user could pose as the owner and attempt to seize control of the shadow token related to a recently purchased ERC-721 token.

While a deal of effort has been spent on selling works of art on the blockchain, very little attention has been paid to using the blockchain as a means of fundraising to help finance the artist's work in the first place. Additionally, while blockchains like Ethereum are ideal for smaller works of art, additional support is needed when the artwork is larger than is feasible to store on the blockchain.

Disclosed is a fundraising mechanism that helps artists to gain financial support for their initiatives, and where the backers can receive a share of the profits in exchange for their support. Using the disclosed approach, the blockchain system, can provide support for ongoing storage of the NFTs. Finally, an approach is disclosed to allow NFT to be transferred back and forth between a first blockchain and a second blockchain.

As the world moves to an online, digital retail model, there has been a struggle to find ways to reward artists and other content creators for their work.

NFTs allow artists to create their work and then sell it online, with ownership tracked on the blockchain to determine who owns the unique copy of the work of art. While NFTs offer a model for artists to sell their work, they do not intrinsically offer a way for artists to raise funds to help them create their projects in the first place. Additionally, while NFTs offer a good model for storing smaller amounts of content on the blockchain, the cost of storing a larger work of art on the blockchain quickly becomes prohibitive. Finally, while the ability to move fungible tokens across blockchains has been well studied, comparatively little attention has been paid to transferring NFTs.

A method is disclosed as to how an NFT can be funded on the blockchain through crowdsourcing. An approach is disclosed for the storage of larger NFTs and a token-locking reward protocol can be used to create an ongoing revenue stream to fund long-term NFT storage. Finally, an approach for the transfer of assets between blockchains is disclosed.

To avoid denial-of-service attacks, Ethereum's virtual machine (EVM) includes a notion of gas. Since each Ethereum transaction requires computational resources to execute, each transaction requires a fee. Gas refers to the fee required to conduct a transaction on Ethereum successfully. Clients pay for their transactions by specifying a gas price; if they run out of gas, the effects of the transaction are rolled back, and the miners keep the ether, a Ethereum cryptocurrency used to pay for the transaction.

Ethereum's flexibility introduced the world to a wide variety of new applications for the blockchain. One popular use was the creation of ERC-20 tokens. The ERC-20 specification allows a standard way for organizations to issue tokens as a fundraising mechanism. These tokens typically server as a placeholder for the native currency on a new blockchain; once the new blockchain is launched, clients may exchange these tokens to receive an equivalent amount of native currency on the new blockchain.

While ERC-20 has been an influential design, its focus is on fungible tokens. There is no connection between a fungible token and any unique asset. Essentially, ERC-20 tokens act as an additional currency running on the Ethereum blockchain.

Ethereum ERC-721 provides a standard Application Programming Interface (API) for non-fungible for NFTs within smart contracts. This standard provides basic functionality to track and transfer NFTs ECR-165 provides as standardized way to determine if a given contract supports a given contract interface.

An approach is disclosed whereby a blockchain system can facilitate a decentralized crowdsourcing for artist projects, and also tie successful projects to the resulting NFTs. It is assumed that both the artists and the backers become clients on the blockchain platform. Also, there is a smart contract, the NFT Smart Contract (NFT_SC), which manages the fundraiser and records the contributions. In one embodiment, backers may share the proceeds for the sale of the NFT. In another embodiment, the backers may share the proceeds for viewing of the NFTs. In an embodiment, an artist may wish to retain all funds. The artist may specify that all funds are retained by the artist during the initializing of the fundraiser. In that case, non-monetary benefits from the artist may then be managed off-chain.

Figure 3:
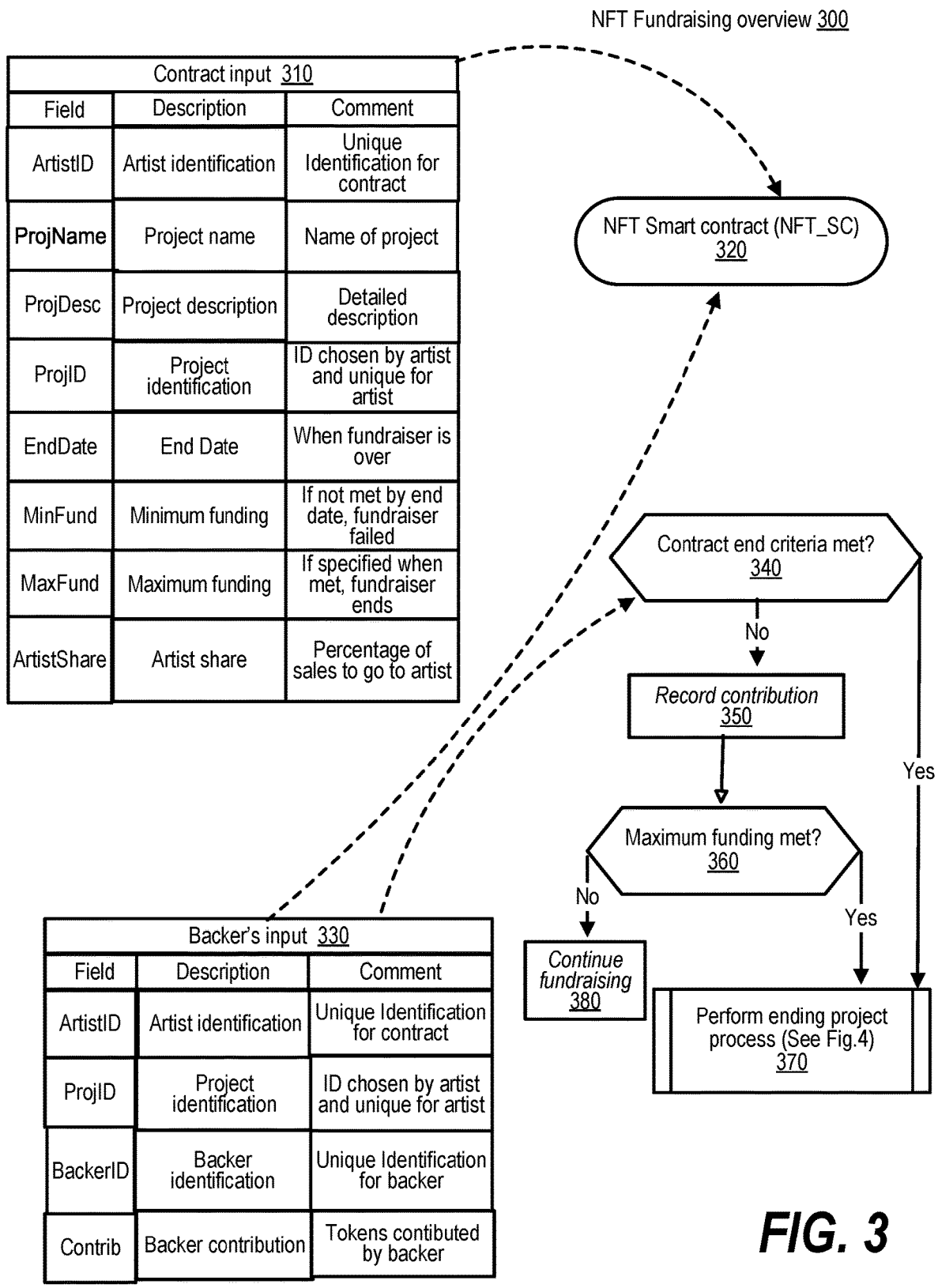
FIG. 3 depicts an overview of process for NFT fundraising.

FIG. 3 depicts an overview of NFT fundraising 300. The artist posts a transaction to the NFT_SC 320 providing contract input 310:

1) The artist posts an NFT seeking a funding transaction to the NFT_SC 320, specifying description, field, and comment:
   a) Artist identification, ArtistID, which identifies the artist with a unique identification for the contract.
   b) Project name, ProjName, which is the name of the project.
   c) Project description, ProjDesc, which gives a detailed description of the project.
   d) Project identification, ProjID, which gives a unique ID chosen by the artist and unique for the artist.
   e) Project end date, EndDate, which is the end date when the fundraiser stops.
   f) Minimum funding, MinFund, which specifies the minimum funding necessary to proceed with the project. If the MinFund is not met by the end date, the fundraiser fails.
   g) Maximum funding, MaxFund, is optional. If specified and the amount is met or exceeded, the fundraiser ends immediately.
   h) Artist share, ArtistShare, is a percentage of sales that go to the artist with values between 0 and 100. When the NFT is eventually sold, this amount specifies what percentage of the sale goes directly to the artist.

2) The Backers post transactions to the NFT_SC 320 when they contribute to the project by providing Backer's contract input 330, specifying description, field, and comment:
   a) Artist identification, ArtistID, which is a unique id for the NFT_SC.
   b) Project identification, ProjID which is the ID chosen by the artist and unique for the artist.
   c) Backer identification, BackerID, which is a unique identification for the backer.
   d) Backer contribution, Contrib, which identify a number of tokens contributed by the backer.

3) The process determines as to whether contract end criteria met (decision 340). If contract end criteria met, then decision 340 branches to the 'yes' branch. On the other hand, if not contract end criteria met, then decision 340 branches to the 'no' branch. The process determines as to whether maximum funding met (decision 360). If maximum funding met, then decision 360 branches to the 'yes' branch. On the other hand, if not maximum funding met, then decision 360 branches to the 'no' branch. At step 380, the process continues fundraising. At step 370, the process performs ending project process (See FIG. 4 and corresponding text). NFT_SC 320 ensures the smart contract is ended by following the process to end the fundraiser at step 370. If end criteria are not met, the NFT_SC 320 records the contribution at step 350. If the maximum funding goal is met, the fundraiser ends.

When the fundraiser ends, the NFT_SC 320 verifies that the funding goal has been met. If so, the contributions are recorded, and the funds are transferred to the artist. Otherwise, all funds are returned to the backers. In an embodiment, who initiates the end funding transaction depends on the result. If the fundraiser is successful, it is in the best interest of the artist to write the end funding transaction in order to get access to the raised funds. Otherwise, any of the backers can call the NFT_SC 320 to reclaim funds from an unsuccessful fundraiser. If there are multiple backers, this situation could result in a waiting game, where each backer hopes one of the others will bear the cost of the end funding transaction. This issue could potentially be addressed by compensating the caller from the contributed funds.

After successful fundraising, the artist can use the funding resources to create their project. Once the NFT completed, the artist may call the NFT_SC 320 to release the NFT to the blockchain platform. Initially, the NFT is owned and controlled by the artist, though the backers' shares of the NFT are also recorded.

Figure 4:
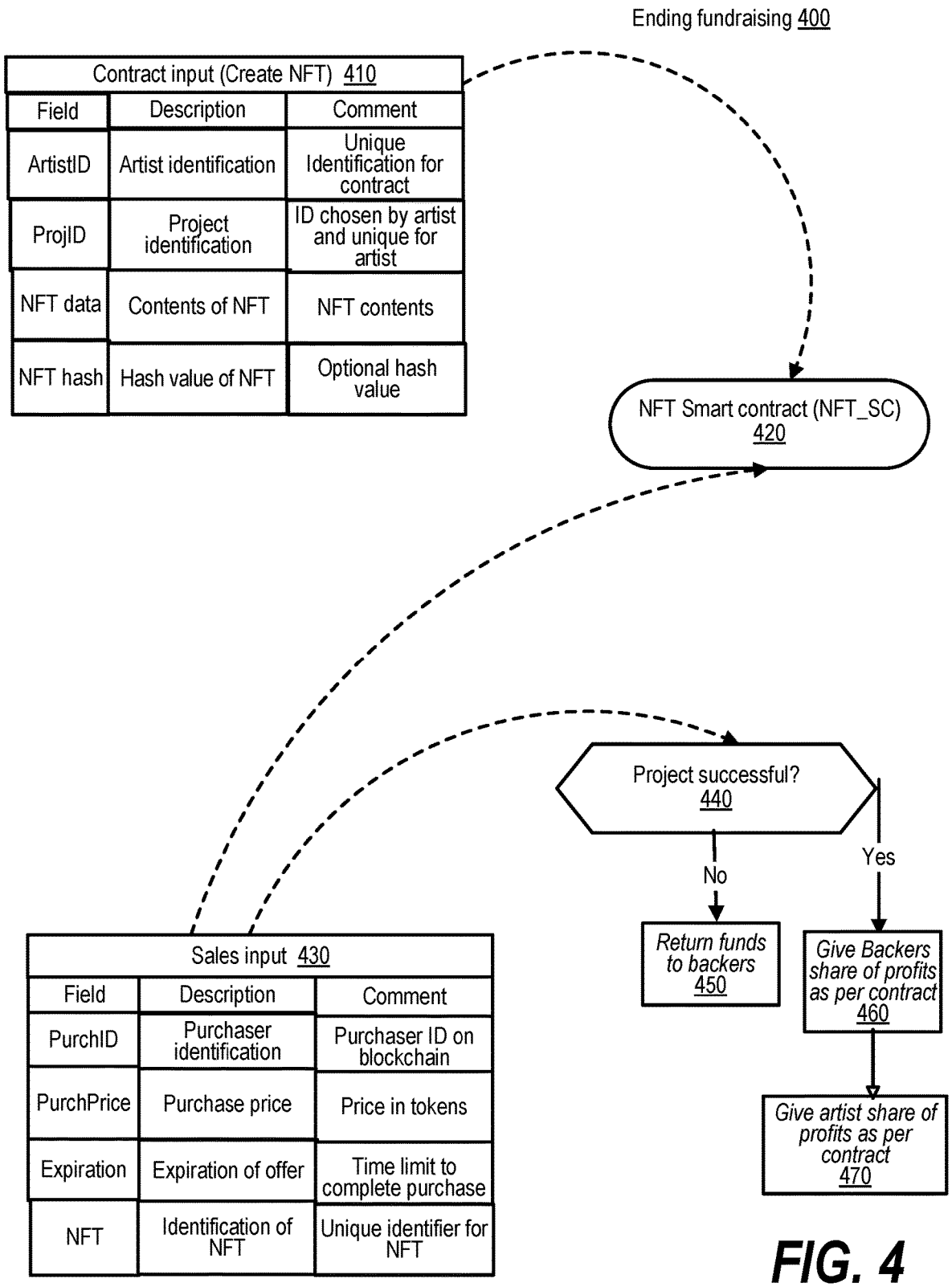
FIG. 4 depicts the steps taken by a process of ending NFT fundraising.

FIG. 4 shows the steps taken by a process that ends fundraising 400. The NFT Smart Contract (NFT_SC) 420 receives the contract input (Create NFT) 410. The contract input 410 includes the information used to create the NFT.

1) The artist posts a transaction to the NFT_SC 420 providing contract input 410 specifying description, field, and comment:
   a) Artist identification, ArtistID, which identifies the artist with a unique identification for the contract.
   b) Project identification, ProjID, which gives a unique ID chosen by the artist and unique for the artist.

c) NFT contents, NFT data, which is the contents of the NFT.
d) Hash value of NFT, NFT hash, which is an option hash value of the NFT. For smaller NFTs, the entire content might be stored on the blockchain, in which case the content hash is unnecessary. For larger NFTs, the data must be uploaded to its storage location before this transaction is written. Specifying the correct hash is the responsibility of the artist, and the blockchain miners are not expected to validate it. However, the specification of the hash allows others to verify the validity of the content off chain. Of course, many storage schemes could be used.

Once the transaction has been written, the NFT_SC records the NFT and tracks the ownership information, including details about the backers' shares.

2) The sales input 430 is sent to the NFT_SC 420. The provided sales input 430 specifies description, field, and comment:
   a) The purchaser information, PurchID, the identification of the purchaser on the blockchain platform of the buyer.
   b) The purchase price, PurchPrice, the price in the blockchain currency, tokens.
   c) The expiration of the offer, Expiration, which identifies a time limit to complete the purchase.
   d) Identification of the NFT, NFT, which is a unique identification of the NFT.

3) The process determines as to whether project successful (decision 440). If project successful, then decision 440 branches to the 'yes' branch. On the other hand, if not project successful, then decision 440 branches to the 'no' branch. At step 450, the process returns funds to backers. At step 460, the process gives the backers share of profits as per contract. At step 470, the process gives artist share of profits as per contract. The NFT_SC 420 serves as an escrow service handling the exchange of the NFT for tokens on the blockchain. Once the transfer is complete, both the artist and their backers receive their tokens, and the buyer receives ownership and control of the NFT.

As part of this transaction, the NFT is transferred to the ownership of the NFT_SC 420. If the offer expires before the buyer has fulfilled the agreement terms, then the artist may call the NFT_SC to reclaim the NFT. To accept the terms of the agreement, the buyer must write to the NFT_SC 420, specifying the NFT, and transferring enough tokens to meet the purchase price. If it does so before the offer expiration, the NFT is transferred to the buyer. Once the exchange is completed, the proceeds from the sale are transferred to the artist and their backers according to the terms specified in the initial fundraising phase of the project.

For smaller NFTs, it is feasible to store the entire NFT directly on the blockchain. However, as the storage needs increase, it becomes exceedingly expensive (or even prohibitive) to store the data directly on the blockchain.

In an embodiment, a token-locking reward model (TLRM) allows for "free" transactions or other services. Instead of paying for service by transferring tokens, clients may temporarily lock their tokens (making them unavailable) in order to generate interest, acting somewhat like a bond where the interest is prepaid. That generated interest may then be given to miners or service providers. Essentially, clients pay in liquidity, but do not permanently lose their tokens.

The NFTs may be tied to storage allocations directly on the blockchain. However, in some embodiment, the data may not be stored on the blockchain itself, but the record of payment for storage and the management of the blobbers storing the data is publicly available on the blockchain.

In an embodiment, when the artist writes a transaction to the blockchain creating the NFT, they may also specify access permissions and any needed requirements for storage, such as the amount of data to be stored and the quality of service required, for example, the speed of access and the reliability of access. Additionally, the artist must provide a supply of tokens to fund the initial storage. Typically the supply of tokens is performed by locking tokens, by the artist, to form a reward source for awarding a payment to the at least two blobbers for creating the NFT. The artist sends NFT data and NFT download details as input to a create NFT request sent to the blockchain platform. The NFT data is stored according to the NFT download details and access information is provided to the artist according to the download details. The access information may include an NFT ID, a URL, and a terms of service for purchasing the NFT. The terms of service may include permission settings, such as, but not limited to an activation date, a deactivation date, and a modification permitted flag. The permission flags or setting may be applied to the at least two blobbers. The permission settings may allow the owner to create an NFT allocation with the capability to upload files and folders without deletion, copy, move, and updates. Alternatively, the permission settings may allow the artist to upload new data and delete data after creating the NFT. The permission setting may allow for additional uploads, updates of existing files, deletion of files, rename of files, moving of existing files, and copying of existing files. The permission settings may allow the owner to set the NFT to immutable and responsive to setting the NFT to immutable the owner may be prohibited from setting the NFT to mutable. The permission setting may allow the owner to revoke previous allowed permission.

Since the NFT itself may not be stored on the blockchain directly, a hash of the content may be stored instead. This hash allows any user accessing the NFT and its off-chain data to verify its authenticity. When the NFT_SC creates the NFT, it assigns a plurality of blobbers to store the NFT based on the specifications of the artist. In a preferred embodiment, at least two blobbers are assigned. The tokens provided by the artist are divided between the read pool and write pool for the NFT.

The artist must upload the erasure coded and optionally encrypted data to the blobbers. As part of this interaction, the artist must send signed write markers to each blobber. These markers include a Merkle root of the erasure coded data, thereby serving both as a handshake between the artist and the blobber and as a form of payment. The blobber may write a transaction to redeem these markers on the blockchain, but doing so serves as the blobber's commitment to store the data that matches the Merkle root specified by the client. A challenge protocol probabilistically ensures that the blobber is both storing the data and that it matches this agreed-upon Merkle root. The blobber is rewarded or punished depending on the results of the challenge. With an NFT, the blockchain should be able to transfer control of the data corresponding to the NFT to the new owner. If the data for the NFT is encrypted, proxy re-encryption may be used to generate re-encryption keys which requires the original private key used to encrypt the data. This requires the blobbers to re-encrypt the data when an NFT's ownership changes. In this case, the blobbers need to be compensated for their additional work. When selling an NFT on the blockchain platform, the ownership of the associated data allocation must also be transferred with it. When the allocation is transferred to the new owner, the tokens in the corresponding read and write pools remain associated with the NFT. In this way, the initial cost of storing the NFT is already handled by the previous owner.

If the data for the NFT is not encrypted, no other change is needed to the process. Essentially, a storage allocation for an NFT can be handled like any other. Ideally, the allocation should be marked as read-only, thereby guaranteeing to any buyer of an NFT that the content has not changed from the original hash. While this does not guarantee that the data originally updated is correct, an auditing service could be used to review the NFT and provide a stamp of approval on the blockchain.

A more interesting case arises when the data for the NFT is encrypted. When proxy re-encryption is used, the NFT owner would first erasure code the data into separate partitions given to each storage provider, and then encrypt the partitions using its public key. When providing read access to other parties, the owner would take the receiver's public key and the owner's own public/private key pair to generate a re-encryption key. The re-encryption key is sent to the blobbers, who can re-encrypt the data as if it had been originally encrypted with the receiver's public key. The advantage of this approach is that the blobbers do not have access to the original content but can re-encrypt the data for the new owner.

The blobbers would need to re-encrypt their storage using the re-encryption key. However, they would need to be compensated for their work, and to ensure that the Merkle root that they have committed to storing matches the data that they are actually storing. As a result, the buyer would need to calculate the Merkle roots for each data chunk and upload matching write markers to all blobbers.

In some embodiments, for NFTs stored on the blockchain, the initial cost is high, but the NFT owner does not need to pay maintenance costs. Since data on the blockchain is permanent, it will always be available as long as the full blockchain is stored by some subset of the mining network. In other embodiments, storage is an ongoing cost. Clients pay blobbers for a period of storage; when that period ends, the client must negotiate to continue the storage contract, or else let the storage allocation expire. This model allows storage to be done more cheaply, but requires ongoing funds to maintain the NFT.

The token-locking reward model can be used to create permanent storage. By locking tokens for a set period of time, the client earns additional tokens as a form of pre-paid interest. Those tokens can be spent however the client wishes, and is the basis for the "free" transaction model.

In an embodiment, in order to create permanent storage for an NFT, the owner needs to create an additional token pool, referred to as the NFT funding pool. The NFT funding pool may be periodically locked in order to generate an ongoing revenue stream for the NFT's write pool. For example, assuming that the cost of storing an NFT is 20 tokens for 90 days, and that the interest rate for locking tokens is 10% for the same period. The owner can create a receiver on the owner's behalf by populating the NFT funding pool with 200 tokens. By locking the tokens in the NFT funding pool, 20 tokens would be minted and added to the write pool for the NFT. When the duration of the storage contract elapses, the tokens in the NFT funding pool would also unlock, allowing the owner to relock them in order to continue funding the NFT's storage.

Figure 5:
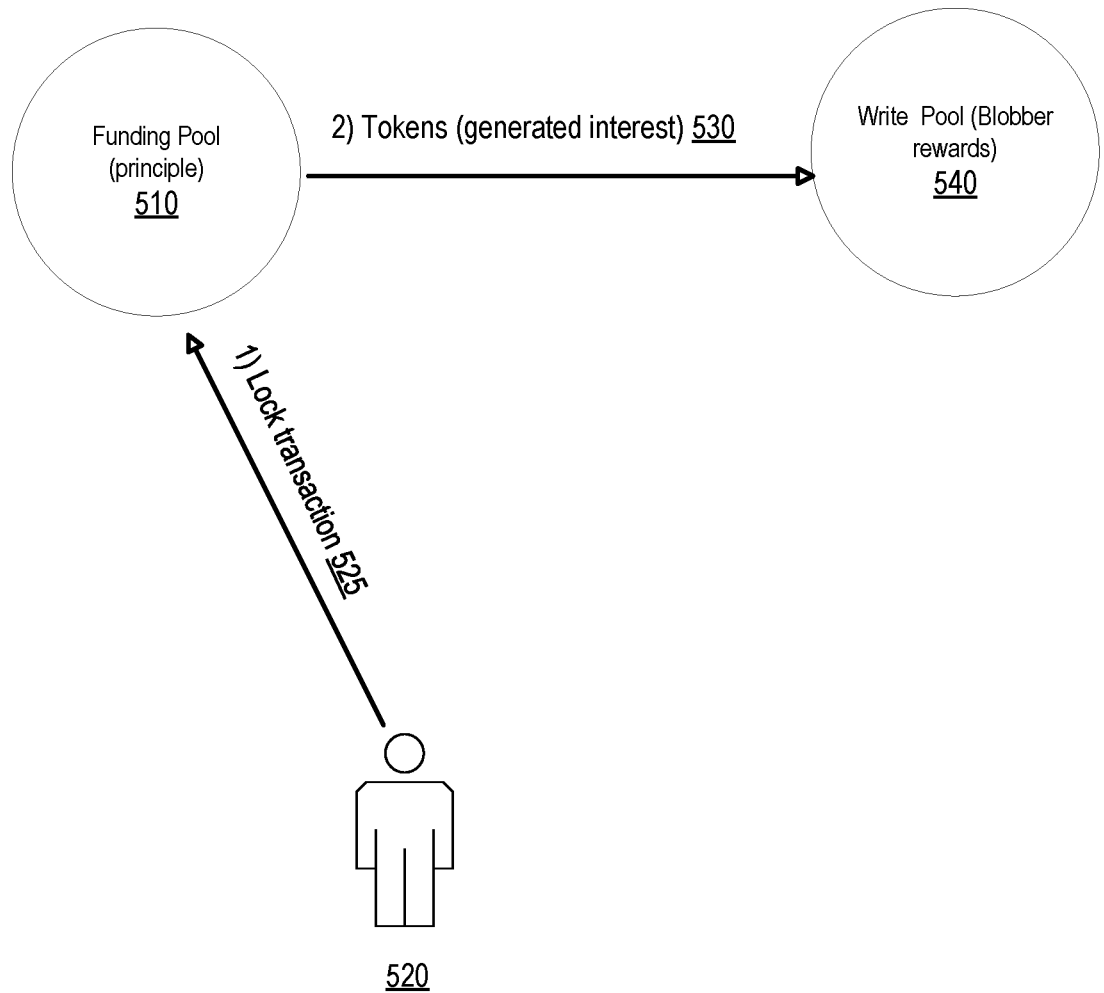
FIG. 5 depict a high-level flow of processing funding NFTs.

FIG. 5 depict a high-level flow of processing NFT funding 500. The user 520 submits a lock token transaction 525 to the blockchain platform. This creates a funding pool (principle) 510. The act of locking the principle 510 generates interest, new tokens 530. The new tokens 530 are added to a write pool used as blobber rewards 540.

This design should consider price fluctuations in the cost of storage and the value of tokens. Should the price of native currency rise compared to the cost of storage, additional rewards are generated for the write pool, and could be used to offset periods where the price drops. On the other hand, if the cost of storage drops below the amount of tokens that the NFT funding pool can generate, then the same blobbers will be unwilling to provide storage. However, other blobbers with lower quality of storage could be used as backup storage providers. The notion of archival blobbers is introduced; these blobbers would provide cheap storage, but with extremely low read rates. In their role, they could help NFTs to weather sudden, unexpected rises in the cost of storage relative to the value of native currency. Some clients must initialize the transaction and pay the cost of that transaction. In some embodiments, certain types of transactions are designated zero-cost; the re-locking of NFT funding pools could be added to this list. Alternately, a portion of the minted interest tokens could be given to the client to compensate them for the transaction fee, or even to provide a small reward for calling the transaction.

The ability of the token-locking reward protocol to create a steady revenue stream seems likely to be useful in a number of other areas. Whenever an ongoing service needs to be funded, this design provides a model of how that funding could be achieved. Disclosed is an approach for transferring assets across blockchains. In an example embodiment, an NFT is created initially on a different platform from the currently disclosed platform and transferred to the currently disclosed blockchain with the disclosed storage system. With this scenario, a vault may be available on the different platform, that is, a smart contract that accepts NFTs. When the owner of an NFT transfers the NFT to the vault, the owner may earn the right to create a matching NFT on the current blockchain.

Figure 6:
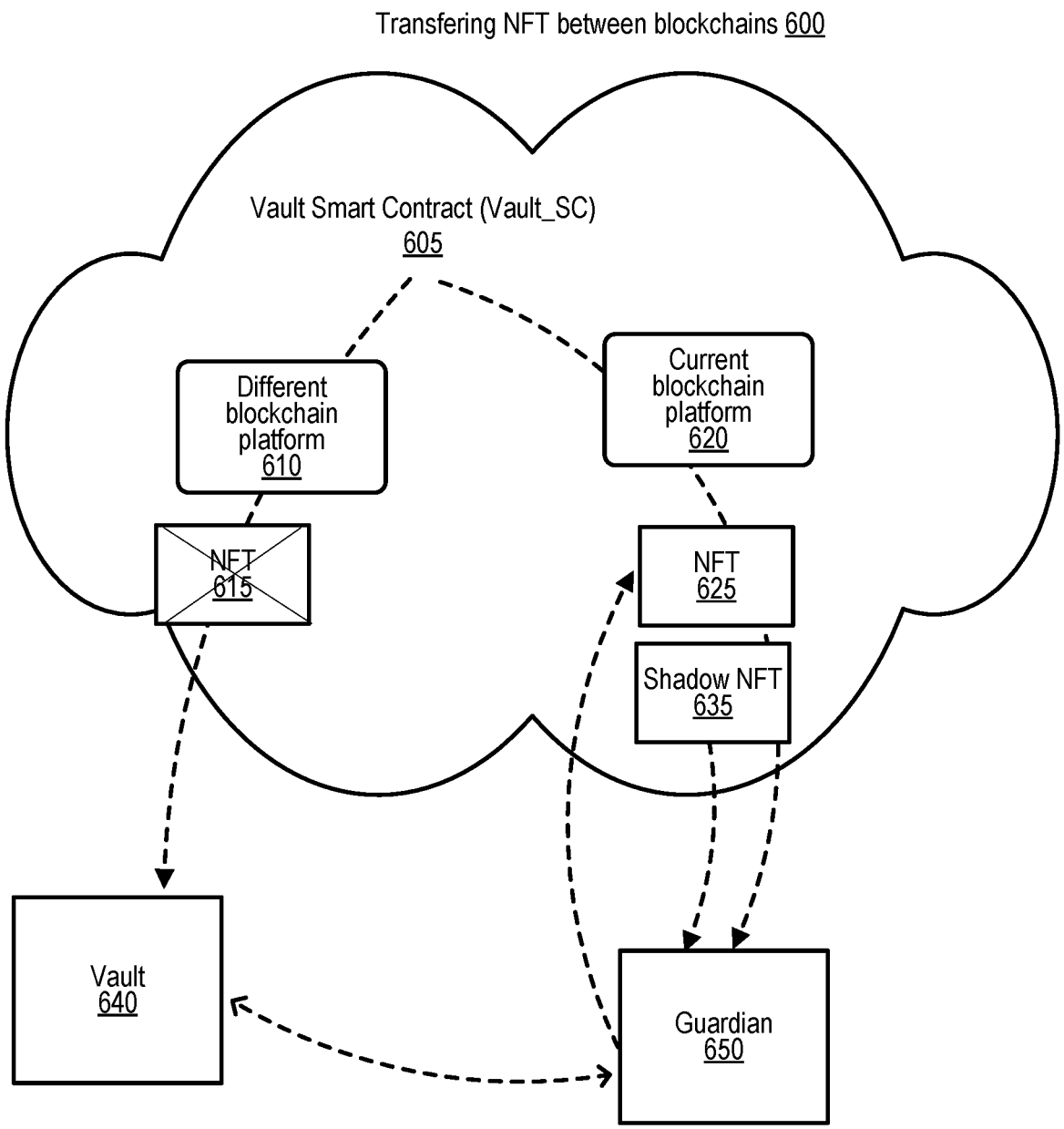
FIG. 6 depicts a pictorial representation of transferring NFTs between blockchains.

FIG. 6 is a pictorial representation of transferring NFTs between blockchains. A Vault Smart Contract (Vault_SC) 605 is invoked on the different blockchain platform 610 authorizing a transfer to a current blockchain platform 620. A guardian 650 is a trusted third party that monitors both the different blockchain platform 610 and the current blockchain platform 620. When the guardian 650 observes that an NFT 615 has been locked in a vault 640 on the different blockchain platform 610, it writes a transaction to the current blockchain platform to authorize the creation of a shadow NFT 635. When the shadow NFT 635 is destroyed, the guardian can likewise authorize the release of an NFT 615 from the vault. In order to avoid duplication of NFTs, it is important that the guardian waits until a sufficient number of blocks have been produced on the current blockchain in order to minimize the chances of a rollback. If the NFT owner decides to exit the current blockchain ecosystem and return to the different platform, they may delete (burn) the NFT 625 on the current blockchain platform 620. When the guardian observes the delete transaction, they write a transaction to the vault 640 on the different platform, allowing the release of the NFT 615. The security of the system depends largely on the guardian 650. However, the danger posed by a single malicious or compromised guardian can be addressed by using a consensus of several guardians. By locking the NFT 615 in the vault 640 on the different blockchain platform 610, the owner of the NFT 615 signals to the guardian 650 the intent to move the NFT 615 to the current blockchain platform 620. The process works as follows:

1) The owner transfers their other platform NFT 615 to the Vault smart contract (Vault_SC) 605. As part of this call, the owner must specify their current platform ID (currID).
2) The guardian observes the transfer and then calls the Vault_SC 605 to create the NFT 625, assigning ownership to the currID.
3) The vault_SC 605 creates a new allocation and assigns storage providers.
4) The owner funds the read and write pools for the allocation, and then uploads data for the NFT.

The owner of an NFT might decide that they would prefer to return it to the other blockchain. Essentially, the owner will provably destroy the shadow NFT on the Current blockchain in order to gain the right to recover the corresponding other platform NFT from the vault. An outline off the process follows:

1) The owner downloads a copy of the NFT's data locally, if it is not already available.
2) The owner calls the Vault_SC 605 to destroy the NFT. As part of this call, it specifies its other platform address. This event signals to the blobbers storing the NFT that they are free to delete the allocation.
3) The guardian 650 observes this transaction and then calls the Vault_SC 605 on the different blockchain platform 610.

An obvious concern is that an NFT could be duplicated on both blockchains with different owners, or perhaps worse yet, that an NFT could be duplicated on the same blockchain.

Assuming the security of the guardian is not compromised, and that there are no unexpectedly deep rollbacks of blocks, this risk is avoided. An NFT cannot be active on the other blockchain once it has been locked in the vault until the NFT has been provably destroyed on the current blockchain. In an embodiment, the approach may not be symmetric in order to guarantee this property. Otherwise, it might not be possible to tell whether an NFT locked in the other blockchain's vault already had an existing shadow NFT on the current blockchain.

Alternately, the NFT and shadow NFT could be annotated with some identifying information that would avoid any duplication. One possible attack could arise if the data of the other platform NFT does not match the data of the shadow NFT on the current blockchain. Potentially, an NFT owner could make it appear as if the shadow NFT related to a more expensive NFT, and then sell it to an unsuspecting buyer. When that buyer attempted to unlock the NFT on the other blockchain, they would discover that they had purchased a different NFT.

This form of fraud could be addressed by an auditing service, which would download and verify that the data matches the content hash of the shadow NFT and that it matches the data for the original other blockchain NFT. This role would require knowledge of both blockchains, putting the guardian in an ideal role to also serve as an auditor.

Figure 7:
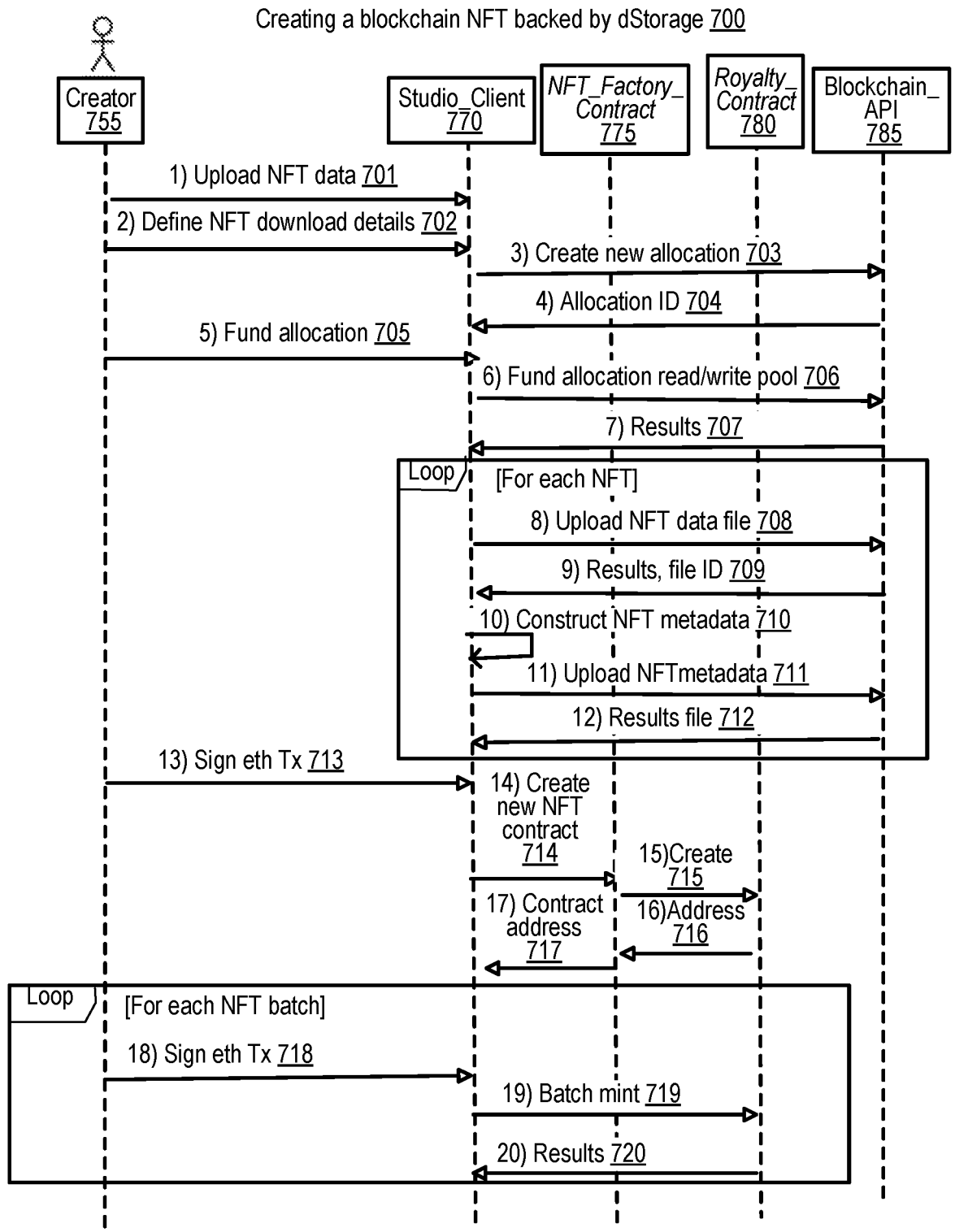
FIG. 7 depicts a flow of creating a blockchain NFT.

FIG. 7 depicts a flow of creating a blockchain NFT backed by dStorage 700. The dStorage support refers to a decentralized data storage layer supported in the disclosed blockchain platform that can efficiently support the large space requirements needed for rich NFT content. The Royalty_Contract 780 is a smart contract which connects with the NFT_SC and executes when a trade happens. The Royalty_Contract 780 disburses a fee portion of the transaction between the creator 755, dStorage, and marketplace entities. The marketplace is a place for people to buy/sell NFTs. The Studio_Client 770 is the user of the Studio platform and is typically the creator 755. The creator 755 is the original studio or artist that created the artwork that is traded by Users in the Marketplace after viewing the Gallery. See FIG. 10 and corresponding text for more details. The following steps occur:

1) [Upload NFT data 701]: The creator 755 of the NFT requests an upload of the NFT data to the Studio_client 770. The Studio_client 770 is a market place for marketing NFTs as well as for receiving backers and funding. Support may be enabled for development, advertising, viewing, and collaboration both requested or offered.
2) [Define NFT download details 702]: The creator 755 identifies funding details, such as, those described in FIG. 3 and corresponding text and sends the identified funding details to the Studio_client 770.
3) [Creates new allocation 703]: The Studio_client 770 invokes a create new NFT allocation interface supported by the blockchain_API 785 with the information needed to create the NFT. This support may be iteratively invoked with information created in various parts. In some embodiments, an NFT ID may be used to indicate continued development.
4) [Allocation ID 704]: The blockchain_API 785 returns an allocation ID to the Studio_Client 770.
5) [Fund allocation 705]: The NFT creator 755 sends fund allocation information to the studio_client 770. This may be, for example, an initial set of locked tokens for a period of time and a set of rules for utilizing the funding. In an embodiment, a set of pools P (P1, P2, . . . , Pn) are allocated with corresponding tokens T (T1, T2, . . . , Tn) for duration of time D (D1, D2, . . . , Dn).
6) [Funds allocation read/write pool 706]: A request from the NFT creator 755 is sent to the blockchain_API 785 to transfer the supplied funds to read/write pools.
7) [Results 707]: The results of the fund transfer request is returned from the blockchain_API 785 to the studio_client 770.
8) [Upload NFT data file 708]: In an embodiment, steps 8) through 12) are repeated iteratively for each NFT supplied for funding by the creator 755. Each separate file that makes up the NFT may be loaded separately and funded separately being sent by the studio_client 770 to the blockchain_API 785.
9) [Results, file ID 709]: The results of the upload including a file ID are returned from the blockchain_API 785 to the studio_client 770.
10) [Construct NFT metadata 710]: Information about the uploaded file, such as location, number of bytes, name is constructed in the form of NFT metadata by the studio_client 770.
11) [Upload NFT metadata 711]: The constructed NFT metadata 710 is uploaded via the blockchain_API 785 to be stored.
12) [Results file 712]: the results file is returned to the studio_client 770.
13) [Sign eth Tx 713]: The creator 755 signs an Ethereum ERC-721 transaction sent to the studio_client for a new NFT contract.
14) [Create new NFT contract 714]: The studio_client 770 requests a creation of an NFT_Factory contract 775 for the new NFT.
15) [Create 715]: The NFT_Factory_Contract 775 issues a create request to the royalty_contract 780.

16) Address 716]: After creating a new royalty_contract 780, an address of the contract is returned to the NFT_Factory_Contract 775.

17) [Contract address 717]: The NFT_Factory_contract 775 returns the newly created royalty contract to the studio_client 770.

18) [Sign eth Tx 718]: In an embodiment, steps 18) through 20) are repeated iteratively for each NFT batch supplied for funding by the creator 755. The creator 755 signs an Ethereum ERC-721 transaction sent to the studio_client 770 for a new NFT contract.

19) [Batch mint 719]: The studio_client 770 batch mints new tokens as input to the royalty_contract 780.

20) [Results 720]: The results from the royalty_contract 780 mint new tokens are returned to the studio_client 770.

Figure 8:
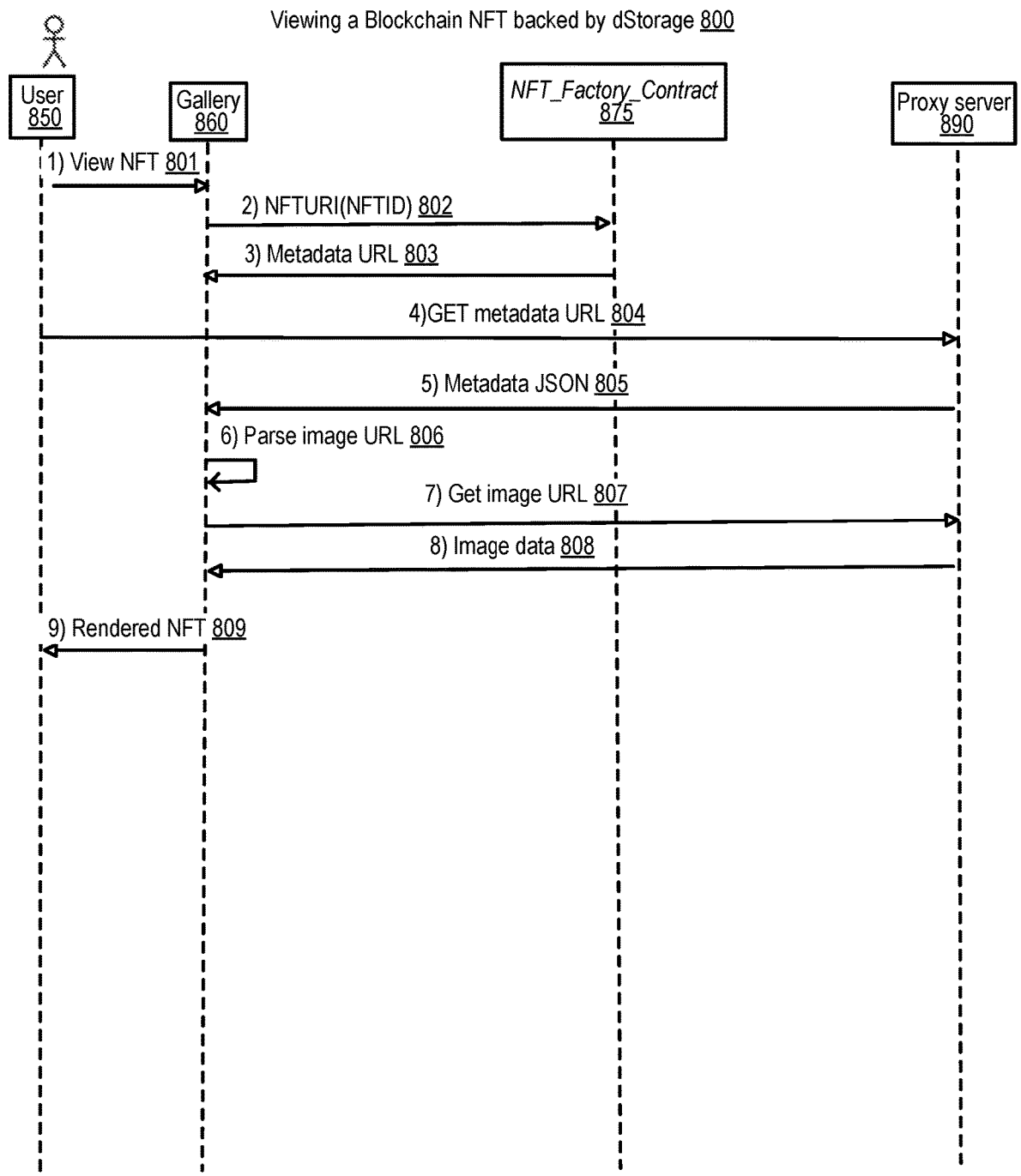
FIG. 8 is a depicts a flow of viewing a blockchain NFT.

FIG. 8 is a depicts a flow of viewing Blockchain NFT backed by dStorage 800. The gallery 860 shows NFTs on display for people to buy/sell/trade like art pieces in an art gallery. The proxy server 890 interacts with blockchain Dstorage providers (blobbers), downloads NFTs, caches the NFTs, and presents a clickable URLs to the NFTs.

The following steps occur:

1) [View NFT 801]: A user 850 requests to view an NFT from the gallery 860 by passing information about the NFT, which may be, for example, but not limited to an address, a Uniform Resource Identifier (URI), Uniform Resource Locator (URL), Uniform Resource Name (URN), and an NFT ID.

2) [NFTURI(NFTID) 802]: The gallery 860 requests viewing access for the requested NFT by invoking NFTURI (NFTID) to the NFT_Factory_contract 875.

3) [Metadata URL 803]: The NFT_Factory_contract 875 returns the URL of the NFT metadata to the galley 860.

4) [GET metadata URL 804]: The user 850 issues a request to get the metadata URL from the blockchain proxy 890 by accessing a metadata JavaScript Object Notation (JSON) script on the proxy server 890.

5) [Metadata JSON 805]: The metadata JSON script returns the metadata to the gallery 860.

6) [Parse image URL 806]: The gallery 860 parses the image URL.

7) [Get image URL 807]: The galley 860 requests get image URL from the proxy 890.

8) [Image data 808]: The proxy 890 returns the image data to the gallery 860.

9) [Rendered NFT 809]: The gallery 860 renders the NFT image to the user 850.

Figure 9:
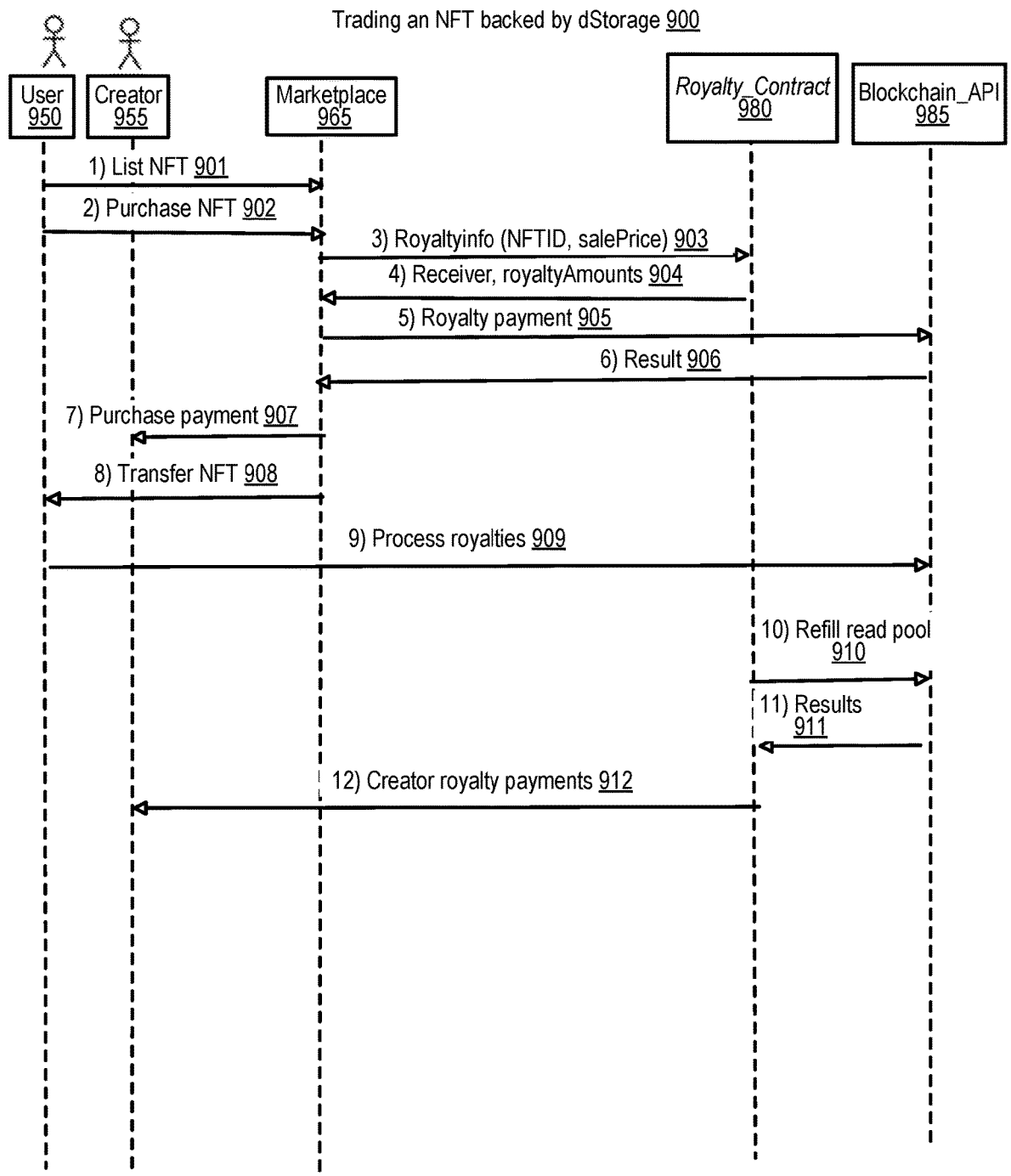
FIG. 9 depicts a flow of trading NFT.

FIG. 9 depicts a flow of trading which is purchasing and selling by traders or speculators without transferring ownership of NFT or packs backed by dStorage 900.

The following steps occur:

1) [List NFT 901]: A user 950 issues a list NFT request to the marketplace 965 which returns a list of NFT to the user 950.

2) [Purchase NFT 902]: From the returned list of NFTs, the user 950 chooses an NFT to purchase. The user 950 issues a purchase NFT request to the marketplace 965.

3) [Royaltyinfo (NFTID, salePrice) 903]: The marketplace 965 determines that the NFT being purchases is under a royalty_contract 980 and invokes the royalty_contract 980 indicating the NFT ID of the NFT purchased and the sale price of the purchase.

4) [Receiver, royaltyAmounts 904]: The receivers of the royalty are targeted by the marketplace 965 to receive the royalty.

5) [Royalty payment 905]: The marketplace 965 automatically request royalty payment through the blockchain_API 985.

6) [Result 906]: The result of the royalty_contract 980 are returned to the marketplace 965 including how the royalty payment is disbursed.

7) [Purchase payment 907]: In a typical embodiment, a portion of the purchase payment is disbursed to the creator 955, 8) [Transfer NFT 908]: The NFT is transferred from the marketplace 965 to the user 950.

9) [Process royalties 909]: A request to transfer a portion of the royalties for the NFT is made from the user 950 to the blockchain_API 985.

10) [Refill read pool 910]: The royalty_contract 980 invokes the blockchain_API 985 to refill the read pool for the NFT. 11) [Results 911]: The blockchain_API returns the results of the refill read pool request to the royalty_contract 980.

Figure 10:
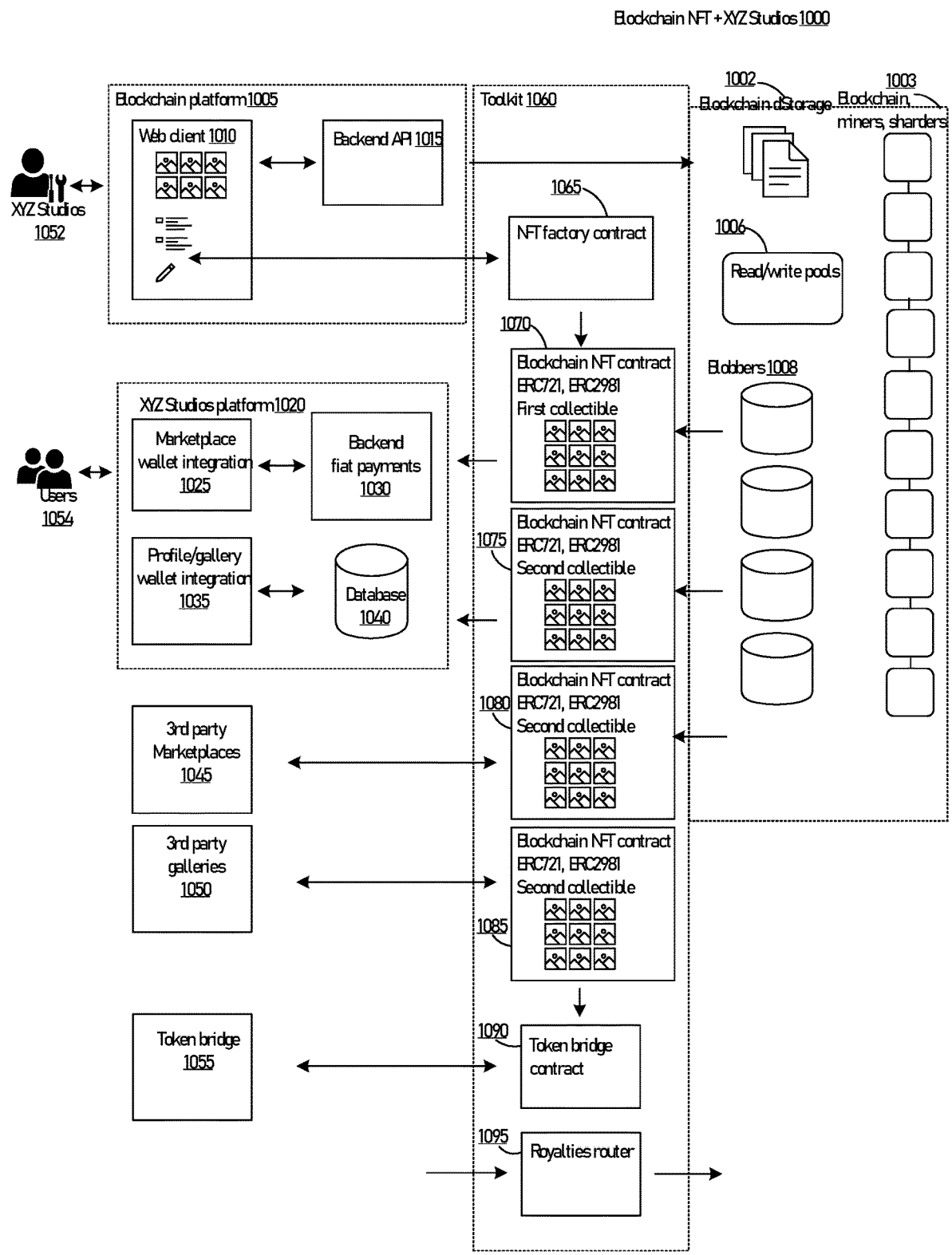
FIG. 10 depicts a schematic diagram of blockchain NFT+ XYZ Studios: 1000.

12) [Creator royalty payments 912]: The creator royalty payments are disbursed by the royalty contract to the creator FIG. 10 depicts a schematic diagram of blockchain NFT+ XYZ Studios 1000. NFTs and collections of NFT, called packs, may be to grouped to raise money. In an embodiment, support may be provided by selecting a random number of NFT to be purchased with the content revealed only after purchase. Users may be traders of NFTs and packs. The marketplace is a place for people to buy/sell NFTs and Packs.

The XYZ studios 1052 may support an artist or creator of NFTs. XYZ studios interacts with the blockchain platform 1005 using a web client 1010. The web client 1010 utilizes toolkit 1060 to perform configurable operation that may be tailored for XYZ studios 1052 requirements. With the disclosed high performance blockchain and storage network, referred to as blockchain dStorage 1002, the disclosed support fills a critical need in the NFT space, by providing a decentralized data storage layer that can efficiently support the large space requirements needed for rich token content. In an embodiment, the toolkit 1060 provides a set of tools that allows creators to easily deploy, mint, and manage custom token collections on the blockchain, while storing all token metadata on the blockchain. The blockchain dStorage 1002 infrastructure includes storage providers and storage accessors, including blobbers 1008, miners, sharders, and validators 1003. Payment for performing services is supported by read/write pools 1006. The Web client 1010 invokes an NFT factory contract 1065 supporting various NFT operations. The operations may include blockchain NFT contract ERC721 and/or ERC2981 which may create, access, view, and transfer ownership for collectibles. Transferring ownership is different from trading NFTs. Usually artists/creators own the NFT and get royalties on all trades, in the case of a studio selling the NFT royalty rights to someone, the NFT rights are transferred to the new owner.

Multiple different collectables may be supported, for a first collectible 1070 and a second collectable 1080. Where support for payment of access is via backend payments 1030 backed by a marketplace wallet integration 1025 and a profile/gallery wallet integration 1035. Various contracts may be applied for the different collectables, for a $3^{rd}$ party marketplace 1045 may be set up for with a contract for processing the second collectible 1075 and $3^{rd}$ party galleries 1050 may be set up with a blockchain NFT contract ERC721, ERC2981 for the second collectible 1085. Token bridge contract 1090 utilizing token bridge 1055 may be used to cross blockchains with support for royalty's router 1095. In an embodiment, support for accessing the collectibles may be included in an XYZ studio platform 1020, which allows users 1054 to utilize marketplace wallet integration 1025. The market wallet integration 1025 utilizes backend payments 1030. In an embodiment, a studio webapp is provided to enable a creator to easily deploy an NFT contract to the public blockchain (e.g. Ethereum or Polygon), manage the contract, and mint tokens. It also allows the creator to create a new storage allocation on the disclosed blockchain, curate their token metadata, and store that data to the allocation. The NFT contract itself stores a reference to that data on the blockchain dStorage network, which can then be used by any third party system such as a gallery or marketplace to access the metadata for each token. The toolkit may provide studios and artists with a rich feature set including, for example, but not limited to (1) Launching a new NFT (ERC721) contract with zero code; (2) Configuring and managing tailored token contracts; (3) Curating and storing token metadata on the blockchains dStorage; (4) Seamless integration between the blockchain network and the blockchain dStorage network; (5) Minting new tokens with a few clicks; (6) Hosting a public token sale; (7) Distributing packs containing a random set of tokens that is only revealed when the pack is opened; (8) Multi-chain support; (9) Highly configurable storage settings to support freezing metadata, pack mechanics, data reveals, dynamic content, and the like; and (10) Interoperable with third party marketplaces, galleries, and other platforms.

The disclosed NFT studio may be configured to support a wide variety of NFT use cases. Examples include, but are not limited to: (1) Artists minting limited edition pieces; (2) Artists may directly mint 1/1 or limited edition art pieces, which can then be displayed in a gallery or sold on a third party marketplace; (3) Studio releasing a series of collectibles; Studios can create a large batch of collectible tokens to be distributed individually or in packs. Fans can then claim or purchase these tokens, trade them with other users, sell them on secondary marketplaces, or display them in a gallery; (4) Profile picture (PFP) collectible drop which may include an initial token sale or distribution and leverage the trustless features of the blockchain dStorage such as decentralized storage and metadata freezing.

Figure 11:
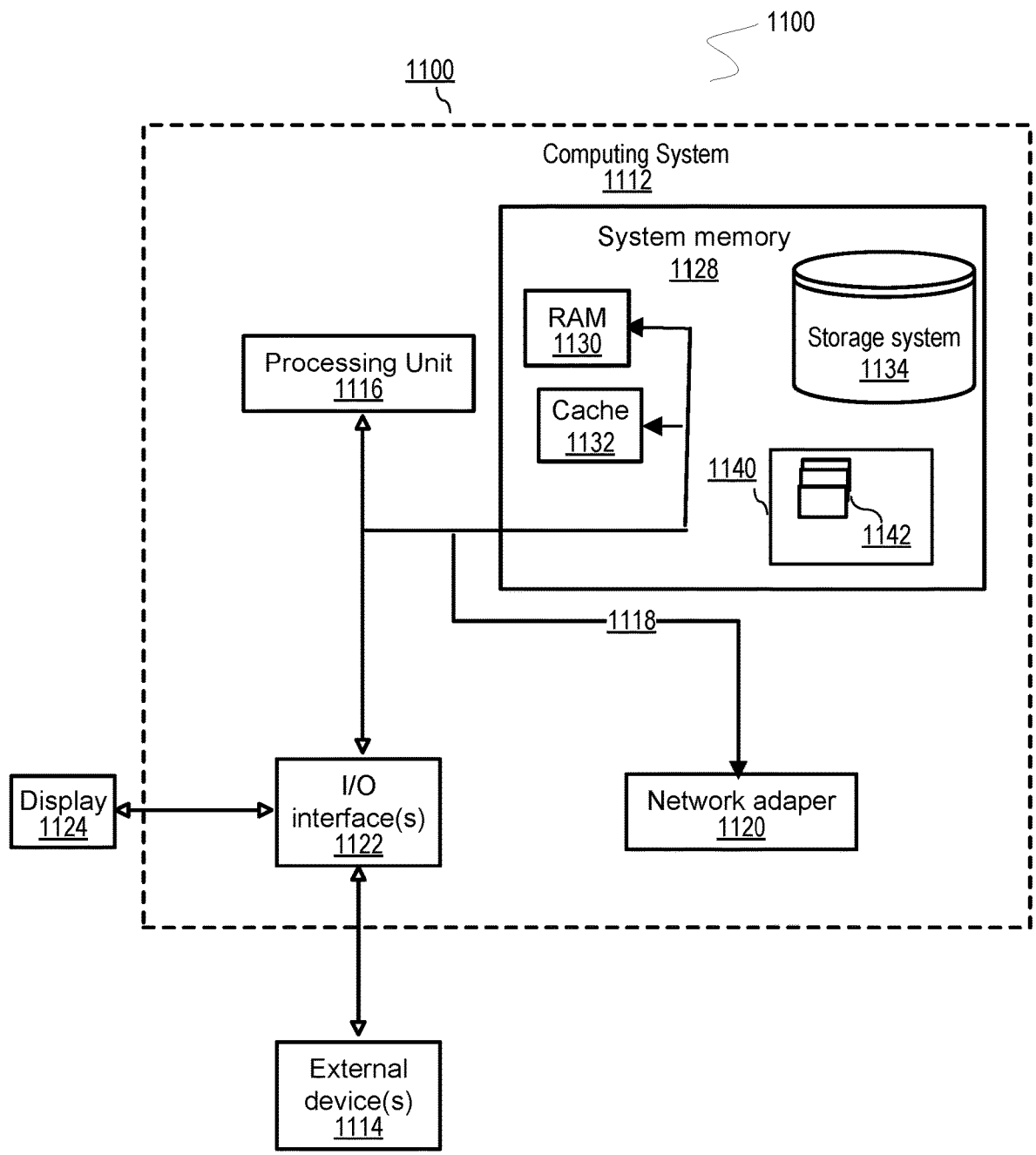
FIG. 11 depicts a schematic view of a processing system wherein the methods of this invention may be implemented.

Referring to FIG. 11, a schematic view of a processing system 1100 is shown wherein the methods of this invention may be implemented. The processing system 1100 is only one example of a suitable system and is not intended to suggest any limitation as to the scope of use or functionality of embodiments of the invention described herein. Regardless, the system 1100 can implement and/or performing any of the functionality set forth herein. In the system 1100 there is a computer system 1112, which is operational with numerous other general purpose or special purpose computing system environments or configurations. Examples of well-known computing systems, environments, and/or configurations that may be suitable for use with the computer system 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 1112 may be described in the general context of computer system-executable instructions, such as program modules, being executed by a computer system. Generally, program modules may include routines, programs, objects, components, logic, data structures, and so on that perform tasks or implement abstract data types. The computer system 1112 may be practiced in distributed cloud computing environments where tasks are performed by remote processing devices that are linked through a communications network. In a distributed cloud computing environment, program modules may be in both local and remote computer system storage media including memory storage devices.

As shown in FIG. 11, the computer system 1112 in the system environment 1100 is shown in the form of a general-purpose computing device. The components of the computer system 1112 may include, but are not limited to, a set of one or more processors or processing units 1116, a system memory 1128, and a bus 1118 that couples various system components including the system memory 1128 to the processor 1116.

The bus 1118 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnects (PCI) bus.

The computer system 1112 typically includes a variety of computer system readable media. Such media may be any available media that is accessible by the computer system 1112, and it includes both volatile and non-volatile media, removable and non-removable media.

The system memory 1128 can include computer system readable media in the form of volatile memory, such as random-access memory (RAM) 1130 and/or a cache memory 1132. The computer system 1112 may further include other removable/non-removable, volatile/non-volatile computer system storage media. By way of example only, a storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1118 by one or more data media interfaces. As will be further depicted and described below, the system memory 1128 may include at least one program product having a set (e.g., at least one) of program modules 1142 that are configured to carry out the functions of embodiments of the invention.

A program/utility 1140, having the set (at least one) of program modules 1142, may be stored in the system memory 1128 by way of example, and not limitation, as well as an operating system, one or more application programs, other program modules, and program data. Each of the operating systems may have one or more application programs, other program modules, and program data or some combination thereof, and may include an implementation of a networking environment. The program modules 1142 generally carry out the functions and/or methodologies of embodiments of the invention as described herein.

The computer system 1112 may also communicate with a set of one or more external devices 1114 such as a keyboard, a pointing device, a display 1124, a tablet, a digital pen, etc. wherein these one or more devices enable a user to interact with the computer system 1112; and/or any devices (e.g., network card, modem, etc.) that enable the computer system 1112 to communicate with one or more other computing devices. Such communication can occur via Input/Output (I/O) interfaces 1122. These include wireless devices and other devices that may be connected to the computer system 1112, such as, a USB port, which may be used by a tablet device (not shown). Still yet, the computer system 1112 can communicate with one or more networks such as a local area network (LAN), a general wide area network (WAN), and/or a public network (e.g., the Internet) via a network adapter 1120. As depicted, a network adapter 1120 communicates with the other components of the computer system 1112 via the bus 1118. It should be understood that although not shown, other hardware and/or software components could be used in conjunction with the computer system 1112. Examples include, but are not limited to microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method that includes a processor and a local storage device accessible by the processor for processing NFTs on a blockchain platform comprising:
   receiving a request for the processing of an NFT on the blockchain platform, by a requestor;
   accessing the NFT by chunks C (C1, C2, . . . , Cn) from at least two blobbers B (B1, B2, . . . , Bn); and
   reconstructing the NFT from the chunks C (C1, C2, . . . , Cn) to process the request.

2. The method of claim 1, wherein the requestor is an owner of the NFT and the request is one of: viewing, editing, purchasing, and transferring ownership the NFT to a recipient.

3. The method of claim 2, wherein the request identifies the NFT by specifying a content identification and a path identification.

4. The method of claim 3, wherein the chunks C (C1, C2, . . . , Cn) are encrypted with public keys PK (PK1, PK2, . . . , PKn) of the owner corresponding to the at least two blobbers B (B1, B2, . . . , Bn);
   generating by the owner a re-encryption key K (K1, K2, . . . , Kn) based on a recipient public key RPK (RPK1, RPK2, . . . , RPKn) corresponding to the at least two blobbers B (B1, B2, . . . , Bn) corresponding to the chunks C (C1, C2, . . . , Cn);
   sending to the recipient a reference to the at least two blobbers B (B1, B2, . . . , Bn);
   receiving by the recipient the re-encrypted chunks D (D1, D2, . . . , Dn) corresponding to the encrypted chunks C (C1, C2, . . . , Cn) from the at least two blobbers B (B1, B2, . . . , Bn) using the re-encryption key K (K1, K2, . . . , Kn); and
   decrypting the re-encrypted chunks D (D1, D2, . . . , Dn) into the chunks C (C1, C2, . . . , Cn).

5. The method of claim 4, wherein the re-encryption key K is the same for all of the at least two blobbers B (B1, B2, . . . , Bn).

6. The method of claim 5, wherein the access information includes an NFT ID.

7. The method of claim 5, wherein the access information includes a URL.

8. The method of claim 5, wherein the access information includes terms of service for purchasing the NFT.

9. The method of claim 8, wherein the terms of service further comprise: permission settings.

10. The method of claim 9, wherein the permission settings include at least one of: an activation date, a deactivation date, and a permission flag that allows for additional uploads, updates of existing files, deletion of files, rename of files, moving and copying of existing files.

11. The method of claim 9, wherein the permission settings allow the owner to create an NFT allocation with the capability to upload files and folders without deletion, rename, copy, move, and updates.

12. The method of claim 9, wherein the permission settings allow the owner to upload new data and delete data after creating the NFT.

13. The method of claim 9, wherein the permission settings allow the owner to set the NFT to immutable and responsive to setting the NFT to immutable the owner is prohibited from setting the NFT to mutable.

14. The method of claim 9, wherein the permission setting allows the owner to revoke previous allowed permission.

15. The method of claim 9, wherein the permission settings allow the owner to reveal the NFT at a future date.

16. The method of claim 15, wherein the NFT does not have any identified data asset initially and is used as a fundraising platform with the NFT sold to backers and the data asset is added or revealed at the future date.

17. The method of claim 16, further comprising:
   selecting at least two NFTs at random.

18. The method of claim 10, wherein the permission setting apply to the at least two blobbers B (B1, B2, . . . , Bn).

19. The method of claim 1, wherein the requestor is a creator of the NFT and the request is creating the NFT on the blockchain platform, and wherein the method further comprises:
   locking tokens, by the requestor, to form a reward source for awarding a payment to the at least two blobbers for creating the NFT;
   sending NFT data and NFT download details by the requestor as input to a create NFT request sent to the blockchain platform;
   storing the NFT data according to the NFT download details on the blockchain platform;
   paying by the at least two blobbers B (B1, B2, . . . , Bn) for storing the NFT from the received funds; and
   providing access information to the requestor to the NFT according to the download details.

20. The method of claim 1, wherein the requestor is a purchaser of the NFT and the request is to purchase the NFT on the blockchain platform, and wherein the method further comprises:
  receiving funds, by the blockchain platform, from the requestor of the NFT;
  receiving, NFT data and NFT download details by the blockchain platform;
  storing the NFT data according to the NFT download details on the blockchain platform;
  paying storage providers for storing the NFT from the received funds; and
  providing access information to the requestor to the NFT according to the download details.

21. The method of claim 1, wherein the request further comprises:
  supporting funding for development of the NFT.

22. The method of claim 21, wherein the funding further comprises:
  identifying parameters for the funding where input parameters include an artist identification, a project name, a projected description, a project identification, an end date, a minimum funding, and an artist share.

23. The method of claim 22, wherein a backer input for the funding further comprises:
  the artist identification, the project identification, a backer identification, and a backer contribution.

24. The method of claim 23, further comprising:
  returning unused funds to the backer for an unsuccessful project.

25. The method of claim 23, further comprising:
  providing rewards to the backer for a successful project based on a predetermined algorithm.

26. The method of claim 1, wherein the transferring further comprises:
  supporting moving the NFT from the blockchain platform to a different blockchain platform.

27. The method of claim 26, wherein an exchange rate is used to determine the replacement funds from the amount of the client's funds.

28. The method of claim 26, wherein a first smart contract identifies an amount of the client's funds registered on the first blockchain platform and an amount of the replacement funds on the second blockchain platform.

29. The method of claim 28, wherein the first smart contract includes information.

30. The method of claim 29, wherein the information includes a name of the second blockchain platform, the amount of the funds on the first blockchain platform to eliminate, an address of the client, a receiving address to receive the replacement funds, a nonce, and an authorizer signature.

* * * * *